United States Patent
Aughton et al.

(10) Patent No.: US 11,531,139 B2
(45) Date of Patent: Dec. 20, 2022

(54) RAIN GAUGE FOR MEASURING RAIN FALL IN AN AUTOMATIC WEATHER STATION HAVING AN ULTRASONIC TRANSDUCER FOR TRANSMITTING AND RECEIVING ACUSTIC SIGNALS INTO MEASUREMENT CHAMBER AND PROGRAMMABLE TO DETERMINE WATER LEVEL IN MEASUREMENT CHAMBER

(71) Applicant: Rubicon Research Pty Ltd, Hawthorn East (AU)

(72) Inventors: David John Aughton, Hawthorn East (AU); Joel Michael Delacorn, Hawthorn East (AU); Rolf Dittloff, Hawthorn East (AU); Mario Joseph Siragusano, Hawthorn East (AU)

(73) Assignee: RUBICON RESEARCH PTY LTD, Hawthorn East (AU)

( * ) Notice: Subject to any disclaimer, the term of this patent is extended or adjusted under 35 U.S.C. 154(b) by 249 days.

(21) Appl. No.: 16/762,837

(22) PCT Filed: Nov. 8, 2018

(86) PCT No.: PCT/AU2018/051205
§ 371 (c)(1),
(2) Date: May 8, 2020

(87) PCT Pub. No.: WO2019/090391
PCT Pub. Date: May 16, 2019

(65) Prior Publication Data
US 2021/0026040 A1    Jan. 28, 2021

(30) Foreign Application Priority Data

Nov. 8, 2017 (AU) ................................ 2017904534
Feb. 26, 2018 (AU) ................................ 2018900611

(51) Int. Cl.
*G01W 1/14*    (2006.01)
*G01F 23/296*    (2022.01)
(Continued)

(52) U.S. Cl.
CPC ............. *G01W 1/14* (2013.01); *G01F 23/296* (2013.01); *G01F 25/20* (2022.01); *G01P 5/245* (2013.01); *G01P 13/00* (2013.01)

(58) Field of Classification Search
None
See application file for complete search history.

(56) References Cited

U.S. PATENT DOCUMENTS

| | | | |
|---|---|---|---|
| 8,104,500 B2 * | 1/2012 | Olah | G01F 23/0015 137/213 |
| 8,322,209 B2 * | 12/2012 | Bostrom | G01F 23/2962 73/290 V |
| 2007/0132599 A1 | 6/2007 | DuFaux et al. | |

FOREIGN PATENT DOCUMENTS

| | | |
|---|---|---|
| AU | 3779995 A | 5/1996 |
| AU | 685008 B2 | 1/1998 |

(Continued)

OTHER PUBLICATIONS

International Preliminary Report on Patentability dated Feb. 26, 2019 for corresponding International Application No. PCT/AU2018/051205, filed Nov. 8, 2018.

(Continued)

*Primary Examiner* — Peter J Macchiarolo
*Assistant Examiner* — Jermaine L Jenkins
(74) *Attorney, Agent, or Firm* — David D. Brush; Westman, Champlin & Koehler, P.A.

(57) ABSTRACT

A rain gauge for measurement of rain fall. The rain gauge includes: a measurement chamber having an inlet port at one end and a drainage port at the other end, the drainage port (Continued)

being closed by a valve and programmable to be opened at predefined events to release water collected in measurement chamber; a funnel or collector adapted to receive rain fall opens into the inlet port; and an ultrasonic transducer for transmitting and receiving acoustic signals into measurement chamber. The ultrasonic transducer is programmable to determine the water level in measurement chamber. An automatic weather station including the rain gauge is also provided.

41 Claims, 19 Drawing Sheets

(51) Int. Cl.
*G01P 5/24* (2006.01)
*G01P 13/00* (2006.01)
*G01F 25/20* (2022.01)

(56) References Cited

FOREIGN PATENT DOCUMENTS

| | | | |
|---|---|---|---|
| CN | 201177668 Y | 1/2009 | |
| CN | 101776775 A | 7/2010 | |
| CN | 203732742 U | 7/2014 | |
| CN | 105938060 A * | 9/2016 | ............ H01H 35/18 |
| CN | 205861923 U | 1/2017 | |
| CN | 106443836 A | 2/2017 | |
| DE | 2720602 A1 | 11/1978 | |
| DE | 4231235 A1 | 3/1994 | |
| DE | 19623781 C1 | 10/1997 | |
| KR | 101426782 B1 * | 8/2014 | ............ G01N 1/20 |
| WO | 2019/033158 A1 | 2/2019 | |

OTHER PUBLICATIONS

Written Opinion of the International Searching Authority dated Dec. 6, 2018 for corresponding International Application No. PCT/AU2018/051205, filed Nov. 8, 2018.
International Search Report dated Dec. 6, 2018 for corresponding International Application No. PCT/AU2018/051205, filed Nov. 8, 2018.
Chilean Examination Report dated Feb. 17, 2022 for related Chilean Application No. 1224-2020.
Chinese Office Action dated Oct. 27, 2021 for related Chinese Application No. 201880085101.X.
Second Chinese Office Action dated Mar. 31, 2022 for related Chinese Application No. 201880085101.X.
First Examination Report dated Aug. 29, 2022 for corresponding Indian Application No. 202217016045.

* cited by examiner

RAIN GAUGE FOR MEASURING RAIN FALL IN AN AUTOMATIC WEATHER STATION HAVING AN ULTRASONIC TRANSDUCER FOR TRANSMITTING AND RECEIVING ACUSTIC SIGNALS INTO MEASUREMENT CHAMBER AND PROGRAMMABLE TO DETERMINE WATER LEVEL IN MEASUREMENT CHAMBER

CROSS-REFERENCE TO RELATED APPLICATIONS

This Application is a Section 371 National Stage Application of International Application No. PCT/AU2018/051205, filed Nov. 8, 2018, the content of which is incorporated herein by reference in its entirety, and published as WO 2019/090391 on May 16, 2019, in English.

The present application claims priority from Australian Provisional Patent Application No. 2017904534 filed 8 Nov. 2017 and Australian Patent Application No. 2018900611 filed 26 Feb. 2018, the entire contents of both specifications being incorporated herein by reference.

FIELD OF THE INVENTION

This invention relates to a rain gauge and relates particularly, though not exclusively, to a standalone rain gauge, or a rain gauge that can be incorporated into a computer-controlled irrigation management system or automatic weather station.

DESCRIPTION OF THE PRIOR ART

The standard rain gauge, developed around the start of the 20th century, consists of a funnel attached to a graduated cylinder that fits into a larger container. If the water overflows from the graduated cylinder the outside container will catch it. When measurements are taken, the cylinder will be measured and then the excess will be put in another cylinder and measured. In most cases, the cylinder is marked in mm and will measure up to 25 mm of rainfall. Each horizontal line on the cylinder is 0.2 mm. The larger container collects any rainfall amounts over 25 mm that flows from a small hole near the top of the cylinder. The problem with this type of rain gauge is that it must be manually inspected and emptied on a regular basis. It cannot be integrated into a computer based system and relies on constant human supervision.

In order to automate the measurement of rainfall, the tipping bucket rain gauge was developed. The original tipping bucket rain gauge consists of a large copper cylinder set into the ground. At the top of the cylinder is a funnel that collects and channels the precipitation. The precipitation falls onto one of two small buckets or levers which are balanced in same manner as a scale. After an amount of precipitation equal to 0.2 mm falls, the lever tips and an electrical signal is sent to the recorder. The recorder consists of a pen mounted on an arm attached to a geared wheel that moves once with each signal sent from the collector. When the wheel turns the pen arm moves either up or down leaving a trace on the graph and at the same time making a loud click. Each jump of the arm is sometimes referred to as a 'click' in reference to the noise. The chart is measured in 10-minute periods (vertical lines) and 0.4 mm (horizontal lines) and rotates once every 24 hours and was powered by a clockwork motor that had to be manually wound (now replaced by an electric motor). The tipping bucket rain gauge is not as accurate as the standard rain gauge because the rainfall may stop before the lever has tipped. When the next period of rain begins it may take no more than one or two drops to tip the lever. This would then indicate that 0.2 mm has fallen when in fact only a minute amount has. Tipping buckets also tend to underestimate the amount of rainfall, particularly in snowfall and heavy rainfall events. A further disadvantage is that these devices do not drain properly, typically due to ingress of algae or other residues. The advantage of the tipping bucket rain gauge is that the character of the rain (light, medium or heavy) may be easily obtained. Rainfall character is decided by the total amount of rain that has fallen in a set period (usually 1 hour) and by counting the number of 'clicks' in a 10-minute period the observer can decide the character of the rain. Correction algorithms can be applied to the data as an accepted method of correcting the data for high level rainfall intensity amounts. Modern tipping rain gauges consist of a plastic collector balanced over a pivot. When it tips, it actuates a switch (such as a reed switch) which is then electronically recorded or transmitted to a remote collection station.

SUMMARY OF THE INVENTION

An exemplary embodiment of the present invention may provide a rain gauge for measurement of rain fall, said rain gauge including a measurement chamber having an inlet port at one end and a drainage port at the other end, said drainage port being closed by a ball valve, said ball valve programmable to be opened at predefined events to release water collected in said measurement chamber, a funnel or collector adapted to receive rain fall, said funnel or collector opening into said inlet port, and an ultrasonic transducer for transmitting and receiving acoustic signals into said measurement chamber, said ultrasonic transducer being programmable to determine the water level in said measurement chamber and being programmable to allow calibration of said rain gauge based on the distance between said ultrasonic transducer and said ball valve surface.

Preferably a smooth curved entry into said measurement chamber is provided to reduce turbulence of water entering said measurement chamber.

In a practical embodiment, said measurement chamber includes a sealing ring to ensure fluid tight closure at said drainage port. Preferably said sealing ring is positioned within said drainage port and said ball valve abuts said sealing ring and said drainage port.

Preferably said ball valve is opened and closed by a solenoid actuator. The solenoid actuator may include a ramped member co-operating with said ball valve to allow opening and closing of said ball valve.

In a further embodiment, a float valve is located within said drainage port to prevent ingress of matter when said ball valve is closed. A water overflow drain in said funnel to prevent said measurement chamber from overfilling may also be provided.

In a further aspect wherein, the flow of water into said inlet port does not interfere with the operation of the ultrasonic transducer and said ultrasonic transducer is located above said inlet port.

Preferably an offset pipe links said funnel or collector to said inlet port. The offset pipe allows laminar flow entry of water into said inlet port.

Another aspect includes said funnel or collector having a first filter at its open end to reduce ingress of contaminants into said rain gauge. The first filter may include a perforated metal grid with sharp edges to reduce wind effects and the risk of birds, or other creatures, covering said funnel or collector. A second filter may be located within said funnel or collector and said second filter being finer than said first filter.

Preferably said measuring chamber is tubular and has a constant cross-sectional area.

In a further embodiment said measurement chamber is integrated in a housing, said housing including a solenoid actuator at the top thereof, said solenoid actuator providing movement to a push rod slidably located within said housing, and said push rod co-operating with a rocker arm to engage said ball valve. Preferably said housing includes a plurality of vanes within said drainage port to limit lateral movement of said ball valve.

Preferably said calibration takes into consideration temperature and humidity effects and can be programmed to occur when said measurement chamber is empty and no rainfall is forecast or detected, said calibration based on the distance between said ultrasonic transducer and said valve.

The rain gauge may include a plurality of ultrasonic transducers forming an acoustic anemometer arranged above and around said funnel or collector to allow calculation of wind speed and direction.

A measurement tube may be located within said measurement chamber with one end adjacent said ball valve and the other end secured to said ultrasonic transducer to allow transmission and receiving of said acoustic signals within said measurement tube. At least one air vent may be located in said measurement tube to allow equalisation of water level with both said measurement chamber and said measurement tube.

The rain gauge may have a cap member located within said funnel or collector and above said inlet port, said cap member adapted to guide rainfall into said inlet port. The cap member may be a conical shaped housing and have a gap between the funnel or collector to, in use, guide rainfall from the top of the cap member through said gap and into said inlet port. Cap member is typically supported by a plurality of vertical legs in said funnel or collector. The ultrasonic transducer can be located in said cap member above said measurement chamber.

The rain gauge is preferably programmed to derive or interpolate the change in water level when said ball valve is open to provide a continuous and cumulative measurement of captured rainfall.

The rain gauge may include a cup shaped member sitting inside said funnel or collector, said cup shaped member having a plurality of slots circumferentially around the sides and base thereof to allow rain entering said cup shaped member to flow out through said plurality of slots into said funnel or collector. Preferably a hollow tapered boss projects from the base of said cup shaped member, said hollow tapered boss having an aperture at the top thereof through which a diffuser of a pyranometer protrudes.

The invention may also provide a computer-controlled irrigation management system, including at least one rain gauge as previously defined, said system being programmed to provide operational control and collection of data from said at least one rain gauge.

The invention may also provide an automatic weather station including a rain gauge as previously defined, a solar panel for power, data logger with computer control for operational analysis and one or more of a thermometer, anemometer, wind vane, hygrometer, barometer, ceilometer, present weather sensor and/or visibility sensor, snow depth sensor and pyranometer.

The invention may also provide an automatic weather station including a rain gauge as previously defined, said weather station including a housing with said rain gauge located at the top thereof to collect rainfall, said housing having a Stevenson screen below said rain gauge to shield meteorological instruments contained therein against precipitation and direct heat radiation from outside sources, while allowing air to circulate freely around them.

The housing may include a plurality of ultrasonic transducers forming an acoustic anemometer arranged below said Stevenson screen to allow calculation of wind speed and direction.

The automatic weather station preferably includes a pyranometer located within a cap member extending from said rain gauge. Typically, said pyranometer comprises a UV sensor or photodiode protected by a light diffuser.

Preferably bird control spikes project from said rain gauge to prevent roosting of birds on said weather station. In another embodiment said housing is cylindrical.

In yet another embodiment said housing is formed from interlocking components that are held together by rods passing through holes in said interlocking components. One or more of said rods and/or said holes may incorporate an antenna for radio communication. One or more of said louvres may also incorporate an antenna for radio communication.

BRIEF DESCRIPTION OF THE DRAWINGS

In order that the invention may be more readily understood and put into practical effect, reference will now be made to the accompanying drawings, in which.

DESCRIPTION OF THE PREFERRED EMBODIMENTS

Figure 1:
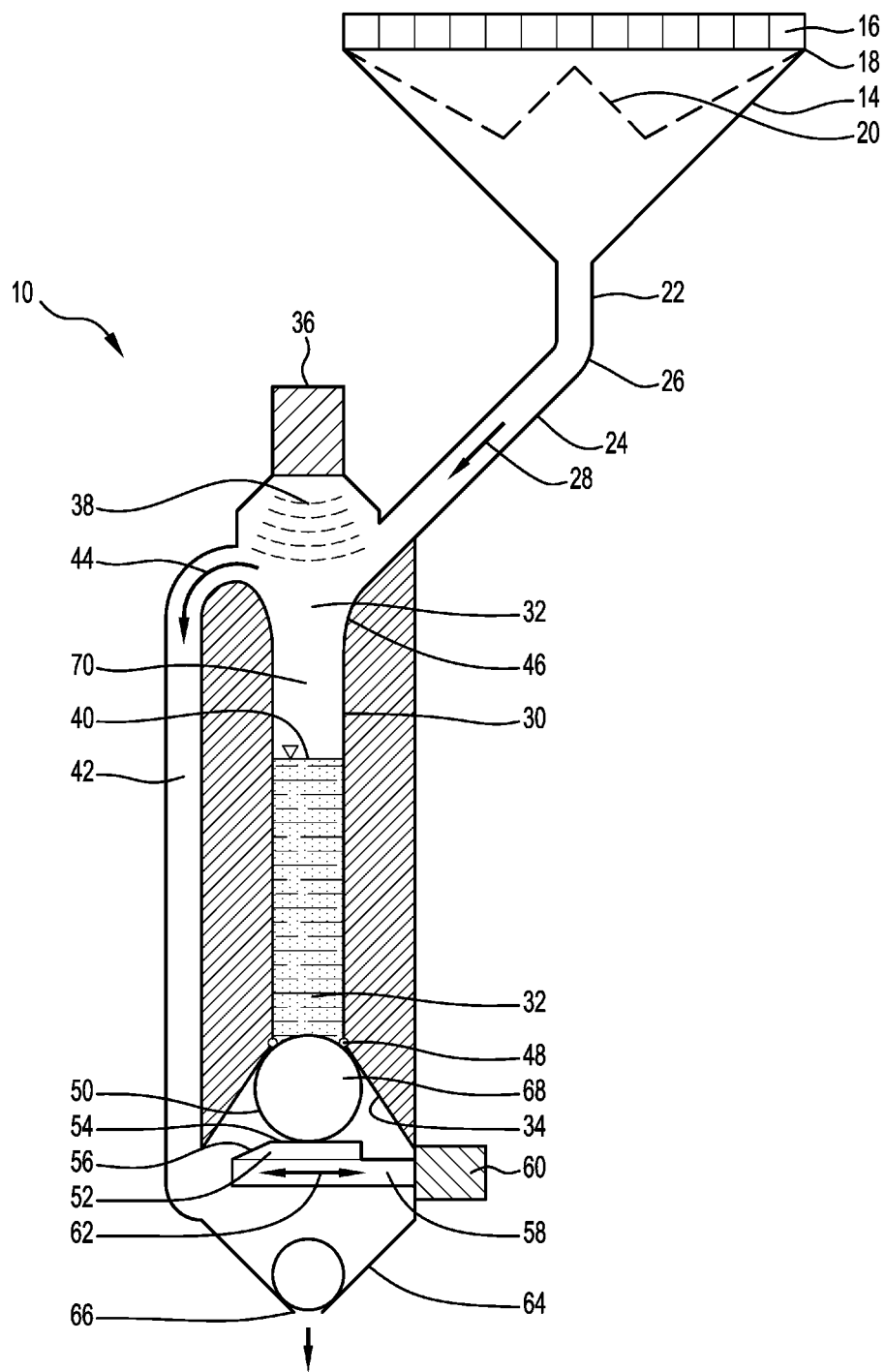
FIG. 1 is a cross-sectional view of a preferred embodiment of a rain gauge made in accordance with the invention.

In FIG. 1 of the drawings there is shown a rain gauge 10 having a main housing 12 and a funnel or collector 14 for capturing rain fall. The funnel or collector 14 is typically conical in shape and is located above main housing 12. In the drawing, there is shown a two-stage filter system with a course filter 16 at the opening 18 and a finer filter 20 located within funnel or collector 14. Although two filters 16, 20 are shown, the invention will operate with one filter, or no filters, if desired. It is preferred that filter 16 be a perforated metal grid with sharp edges, approximately 10 mm deep. The function of filter 16 is to reduce wind effecting the correct volume of precipitation entering funnel or collector 14 and to deter birds, or other creatures, from blocking, standing on or defecating into funnel or collector 14. Funnel or collector 14 narrows down to a small diameter outlet 22 and is connected to an offset pipe 24, preferably of the same diameter as outlet 22. In order to reduce turbulence of water entering offset pipe 24, a curved section 26 links outlet 22 with offset pipe 24. Water will pass along offset pipe 24 in a laminar flow path, as indicated by arrow 28, into measurement chamber 30. The angle of offset pipe 24 relative to main housing 12 can be set to ensure the laminar flow of water therethrough.

Measurement chamber 30 is circular in cross-section and has a cross-sectional area substantially less than the cross-sectional area of opening 18, typically a ratio of 50:1. An inlet port 32 is provided at the top of measurement chamber 30 and a drainage port 34 is provided at the bottom of measurement chamber 30. An ultrasonic transducer 36 is positioned at the top of inlet port 32 and transmits and receives acoustic signals 38 into measurement chamber 30. Measurement of the elapsed time for a signal transmitted and reflected off the water level 40 in measurement chamber 30, will provide data on the distance between the water level 40 and ultrasonic transducer 36 and accordingly, the measurement of rainfall.

In order to protect ultrasonic transducer 36 from water damage, a water overflow passage 42 links inlet port 32 to drainage port 34. Any overfilling of water within measurement chamber 30 will pass into water overflow passage 42 as indicated by arrow 44 and will not interfere with ultrasonic transducer 36. The accuracy of measurement of ultrasonic transducer 36 is enhanced by having a smooth curved or convex section 46 opening into measurement chamber 30. Curved section 46 will maintain the laminar flow from offset pipe 24. The curved section 46 ensures there is no water turbulence that may reflect the acoustic signals 38. The curved section 46 entry also funnels the acoustic signals 38 into measurement chamber 30 to ensure there is no surface reflection at the entry transition of offset pipe 24 and measurement chamber 30.

Measurement chamber 30 opens into drainage port 34 which has a conical cross-section. A circular resilient O-ring 48 is seated in an annular groove in measurement chamber 30. A ball valve 50 closes the measurement chamber 30 and prevents escape of water through the sealing engagement of ball valve 50 against O-ring 48. Ball valve 50 remains in the closed position by the force of a reciprocating ramp member 52. Ramp member 52 has a flat section 54 to maintain the closed position and a beveled section 56 which allows ball valve 50 to drop, when pulled by a plunger 58 of a solenoid actuator 60. The opening and closing movement of solenoid actuator 60 is indicated by arrows 62. Drainage port 34 further includes a conical cap 64 with a drainage hole 66 at the bottom thereof. Drainage hole is covered by a float ball 68 protecting ingress of insects when water is not being released from drainage port 34.

In use, ball valve 50 closes drainage port 34 of measurement chamber 30 with its sealing contact against O-ring 48. Rain water falls into funnel or collector 14 through opening 18 and filtered through filters 16 and 20. Water falls through outlet 22 into offset pipe 24 and flows into inlet port 32 of measurement chamber 30. Ultrasonic transducer 36 transmits and receives acoustic signals 38 in order to measure the elapsed time for the signals to be reflected off the water surface 40 in the measurement chamber 30, if water is present, or reflected off the surface of said ball valve 50, if water is not present. The distance between the water level or ball valve surface and ultrasonic transducer 36 can be measured. The measurements can be interpreted and monitored by a computer monitoring system (not shown) to provide the rainfall data. As measurement chamber 30 fills during precipitation the depth of water 40 is continuously measured until the level reaches a pre-defined depth 70 at which point solenoid actuator 60 operates to move ramp member 52. The movement of ramp member 52 allows ball valve 50 to be lowered by its contact with beveled section 56. Water will be released through drainage port 34 from measurement chamber 30. The solenoid actuator 60 will then operate to push ball valve 50 into O-ring 48 to close measurement chamber 30. Measurement chamber 30 recommences filling and the level is measured again until the level reaches the pre-defined depth 70 and the cycle repeats. The emptying and filling process provide for a continuous unattended measurement of rainfall. It is not necessary for all water to be drained during each cycle as the measurement commences at the level recorded when ball valve 50 closes. The computer monitoring system can provide a visual representation for example, a graph of the rainfall against time. There would be a small gap and a sharp drop in this graph when the valve empties. The computer monitoring system can average the rainfall just prior to the valve opening and just after the valve closing. This data can then be used to provide an interpolated smooth correction of the graph using the averaging.

Figure 2:
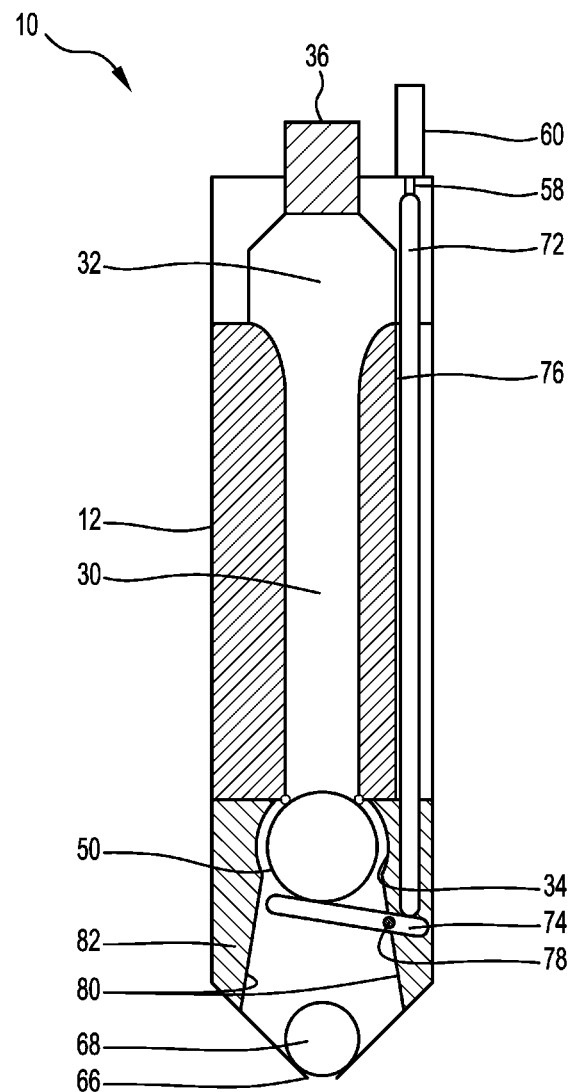
FIG. 2 is a cross-section view of a further embodiment of the rain gauge made in accordance with the invention.

FIG. 2 shows a variation of the embodiment shown in FIG. 1 where the cross-section is taken facing the left-hand side of the view shown in FIG. 1. Accordingly, offset pipe 24, overflow passage 42 and funnel or collector 14 are not shown, but will be incorporated with main housing 12, as per FIG. 1. In order to avoid duplication of description, identical integers in FIG. 1 will have the same reference numerals and function in FIG. 2. The main difference is that solenoid actuator 60 is now positioned at the top of main housing 12 and ramp member 52 has been substituted by a push rod 72 and rocker arm 74. Push rod 72 is slidably located within a longitudinal bore 76 in main housing 12. Push rod 72 contacts the spring-loaded plunger 58 of solenoid actuator 60 at the top and contacts one end of rocker arm 74 at the bottom to maintain the closure of ball valve 50. Rocker arm 74 is pivotally mounted at 78 to one of a plurality of vertical vanes 80, typically four in number, within drainage port 34. Vertical vanes 80 will also restrict the lateral movement of ball valve 50 and float ball 68. The lower section 82 of main housing 12 can be detachable to allow servicing and cleaning thereof.

In use, ball valve 50 will be opened when solenoid actuator 60 is actuated to retract plunger 58. Rocker arm 74 will pivot to release ball valve 50 and empty measurement chamber 30. When solenoid actuator 60 is not actuated, the spring-loaded plunger 58 will force push rod 72 downwardly to pivot rocker arm 74 and close ball valve 50. This embodiment will keep the electrical components, namely the ultrasonic transducer 36 and solenoid actuator 60 away from the water environment.

Figure 3:
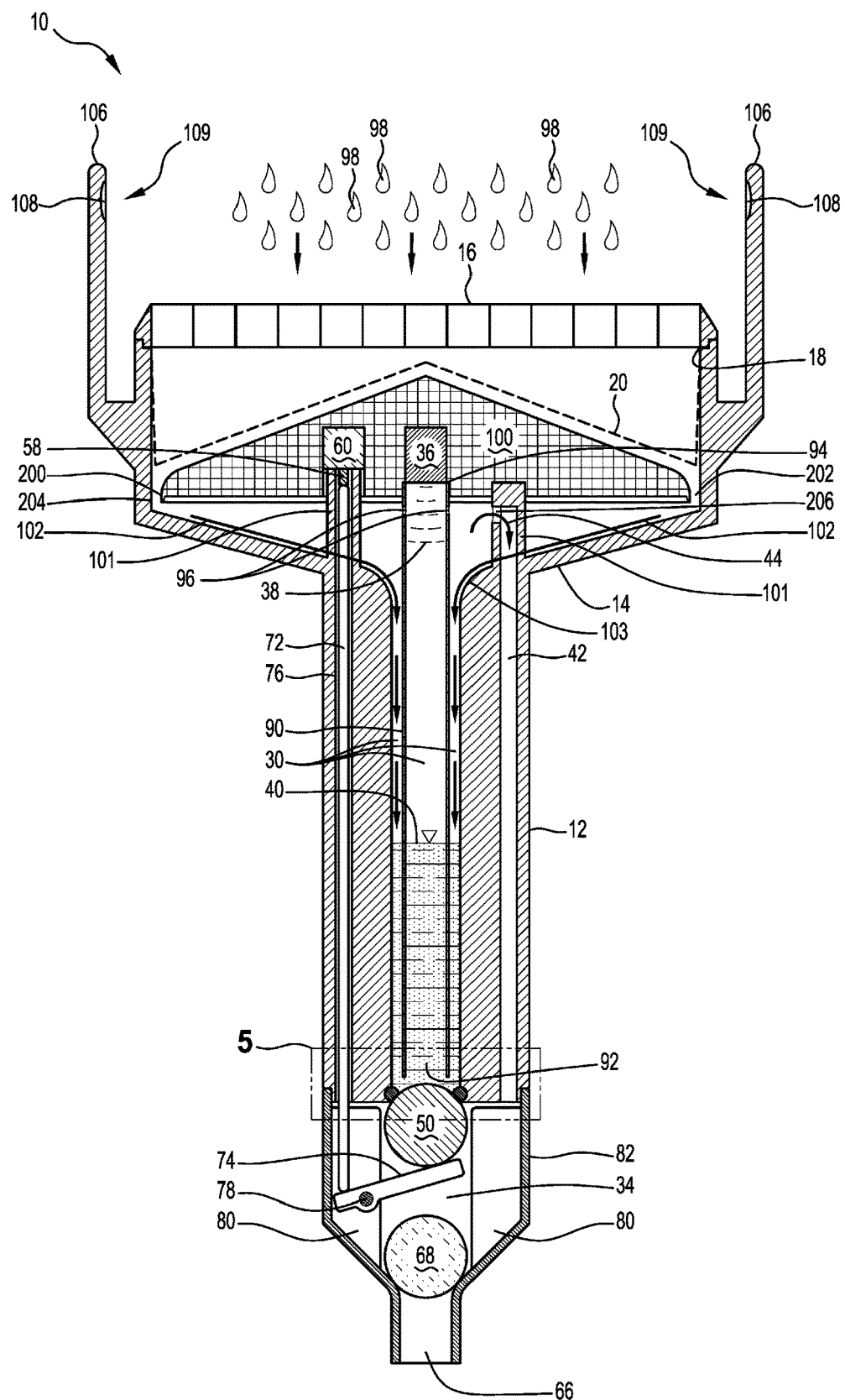
FIG. 3 is a cross-section view of another embodiment of the rain gauge made in accordance with the invention.
Figure 5:
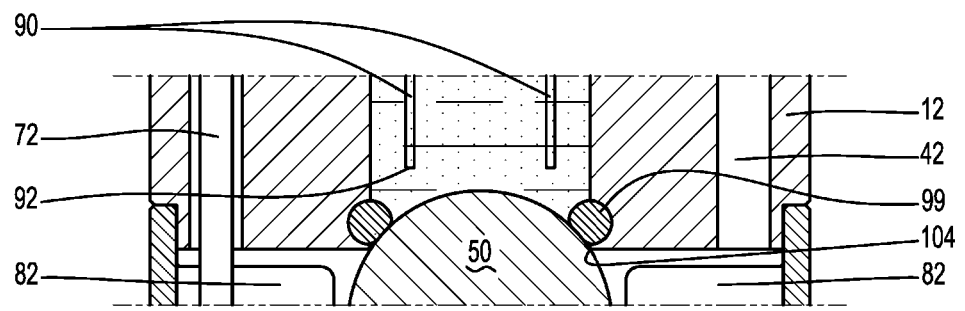
FIG. 5 is an enlargement of the area labeled as 5 in FIG. 3.
Figure 6:
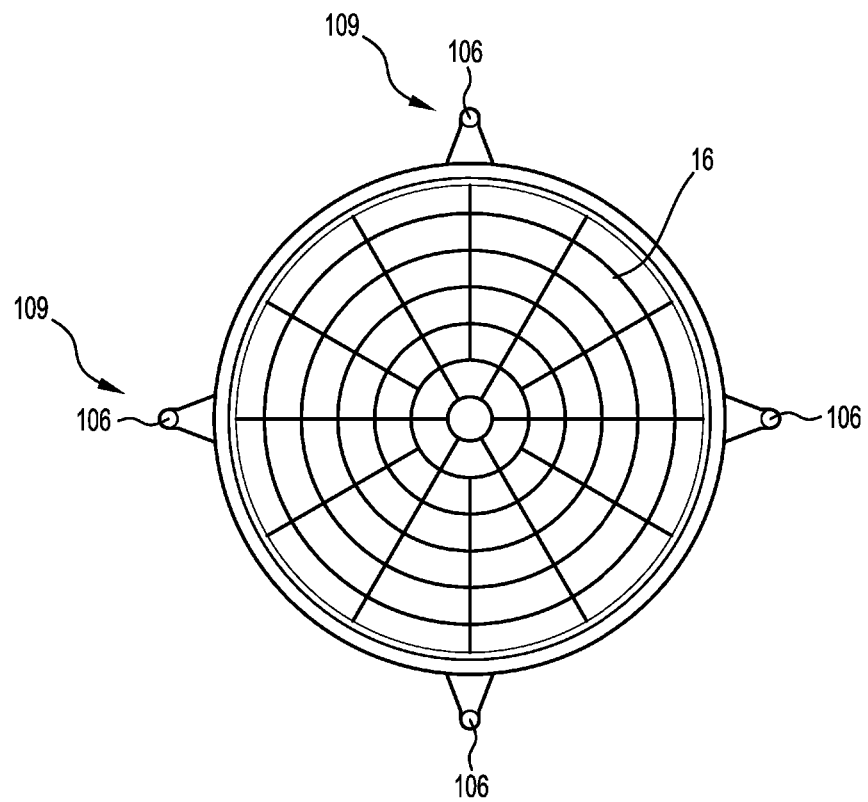
FIG. 6 is a top view of the rain gauge shown in FIG. 3.

FIGS. 3, 5 and 6 show a variation of the embodiment shown in FIG. 2. In order to avoid duplication of description, identical integers in FIGS. 1 and 2 will have the same reference numerals and function in FIGS. 3, 5 and 6. In this embodiment measurement chamber 30 includes a co-axial tube 90 which is open at the bottom 92 and closed at the upper end 94 by ultrasonic transducer 36. The bottom 92 of co-axial or measurement tube 90 is close to ball valve 50 at a distance that allows free entry of water into co-axial tube 90. Air vents 96 adjacent ultrasonic transducer 36 allow the water in measurement chamber 30 to be at the same level as the water in co-axial tube 90 to avoid an air lock.

Turbulence from rain drops 98 entering funnel or collector 14 is controlled by a cap member in the form of a conical shaped housing 100 sitting under filter 20. Conical shaped housing 100 has a curved circumferential rim 200 and forms a co-axial gap 202 with the vertical wall 204 of funnel or collector 14 for rainwater to drain from conical shaped housing 100 into funnel or collector 14. Filter 20 will follow the shape of the conical shaped housing 100 and the vertical wall 204. Conical shaped housing 100 sits on a plurality of vertical legs 101 extending from main body 12 and provide gaps (not shown) to allow water to enter measurement chamber 30 from funnel or collector 14 as indicated by arrows 102. The place of entry into measurement chamber 30 is smoothly curved or convex at 103 to provide laminar flow of the entering water. Conical shaped housing 100 also acts as an umbrella to protect ultrasonic transducer 36 from moisture exposure by being fitted inside. Solenoid actuator 60 is also fitted inside conical shaped housing 100. Related electronic circuitry (not shown) can be readily installed in conical shaped housing 100. Conical shaped housing 100 is easily removed for any required maintenance and allows access to ultrasonic transducer 36 and solenoid actuator 60. The attachment of ultrasonic transducer 36 to co-axial or measurement tube 90 also ensures that there are no water splashes entering the tube which could cause interference and ultrasonic signal reflection. Water overflow passage 42 links to an aperture 206 in at least one of vertical legs 101 and operates in the manner described with reference to FIG. 1. Vertical legs 101 can also contain push rod 72 as shown and electronic wiring (not shown).

In this embodiment O-ring 99, as shown in FIG. 5, is located in a groove slightly offset from the end of main housing 12 to provide a sharp edge 104 that makes contact with ball valve 50 in the closed position. This will ensure that the distance between the top of ball valve 50 and ultrasonic transducer 36 remains constant when acoustic signals are reflected from the top of ball valve 50. Distance errors from the compressibility of O-ring 99 will thus be avoided.

The operation of the embodiment in FIGS. 3, 5 and 6 is very similar to the embodiment shown in FIG. 2. The major difference is that water flows into measurement chamber 30 and co-axial or measurement tube 90 to reach the same level 40. Ultrasonic transducer 36 only transmits and receives acoustic signals 38 within tube 90. Otherwise, the measurement of rainfall and operation of the ball valve 50 is the same as the previously described with reference to the other embodiments.

Figure 4:
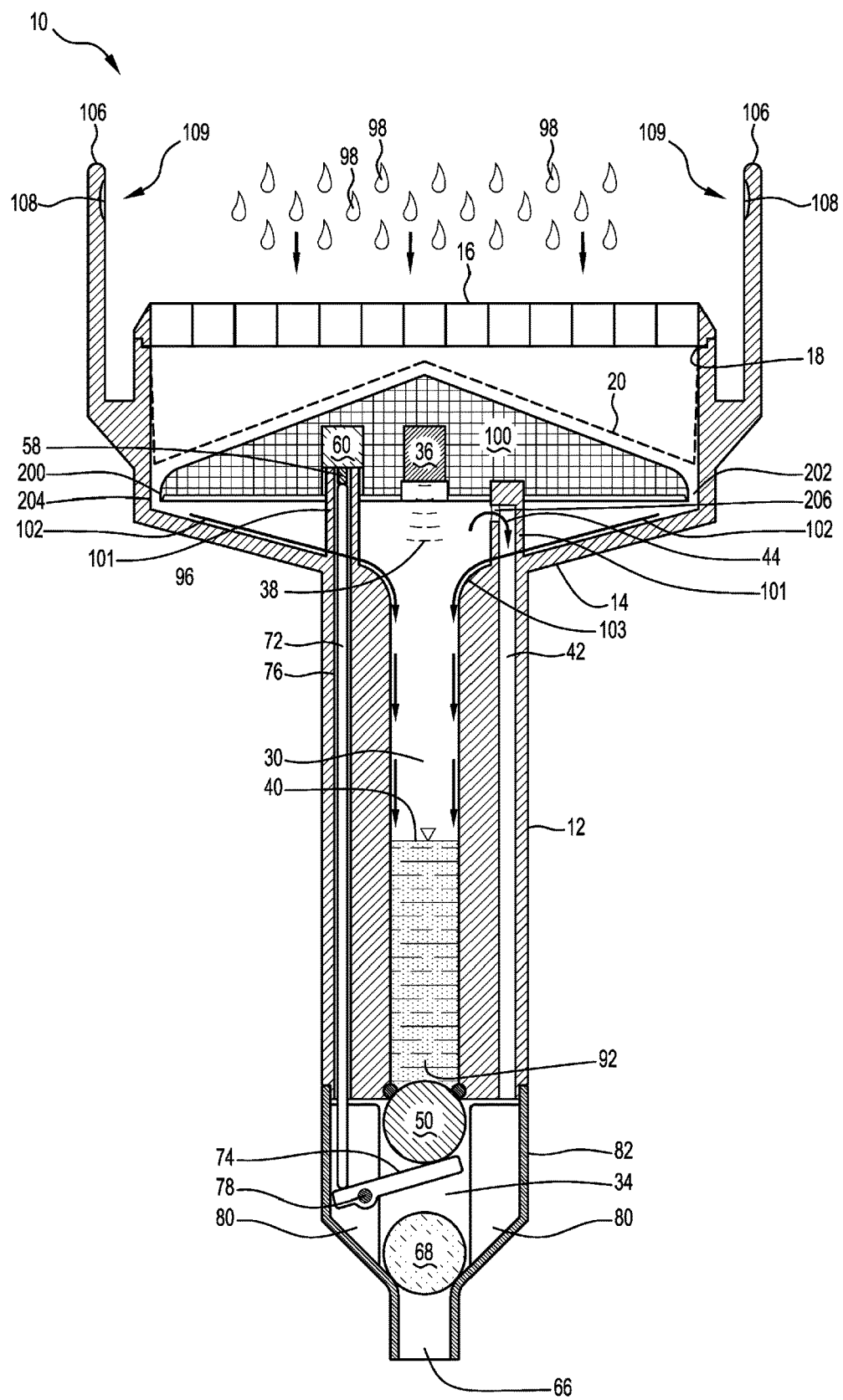
FIG. 4 is a cross-section view of a variation of the rain gauge shown in FIG. 3.

FIG. 4 shows a variation of the embodiment shown in FIGS. 3, 5 and 6. In order to avoid duplication of description, identical integers in FIGS. 3, 5 and 6 will have the same reference numerals and function in FIGS. 3, 5 and 6. The difference between the two embodiments is that measurement tube 90 has been removed and basically operates in a similar manner to that shown in FIGS. 1 and 2.

In all embodiments, the volume calculation derived from the depth of water will be based on the cross-sectional area of the co-axial or measurement tube 90 for the embodiments shown in FIGS. 1, 2 and 4 to 6. The volume calculation for the embodiment shown in FIG. 3 having the co-axial or measurement tube 90, employs a cross-sectional area of the water that is equal to:

(The cross-sectional area of the measurement chamber 30)−(The annular area of the co-axial or measurement tube 90)

Figure 7:
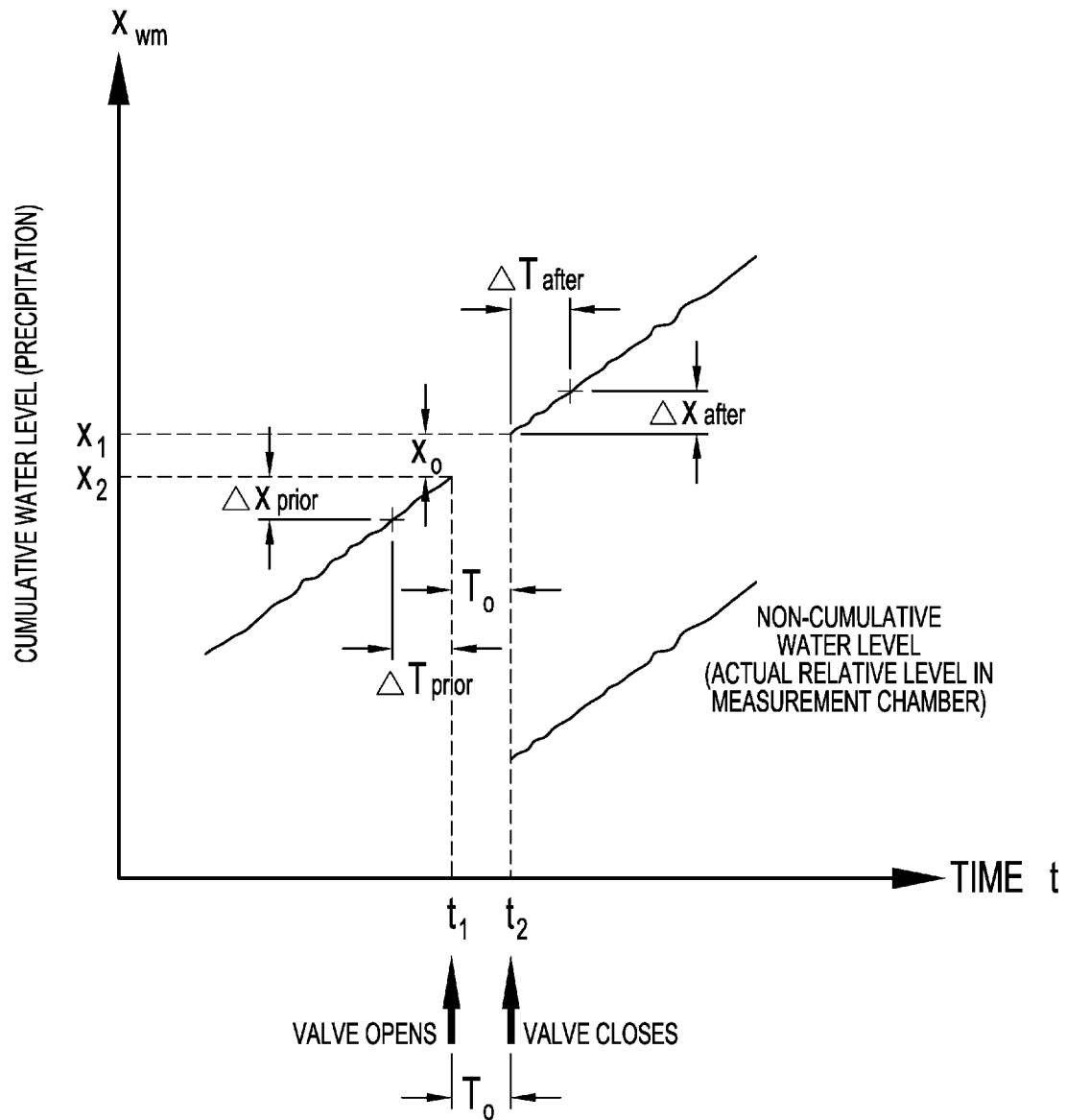
FIG. 7 is a graph of the cumulative water level against time during measurement of rainfall.
Figure 8:
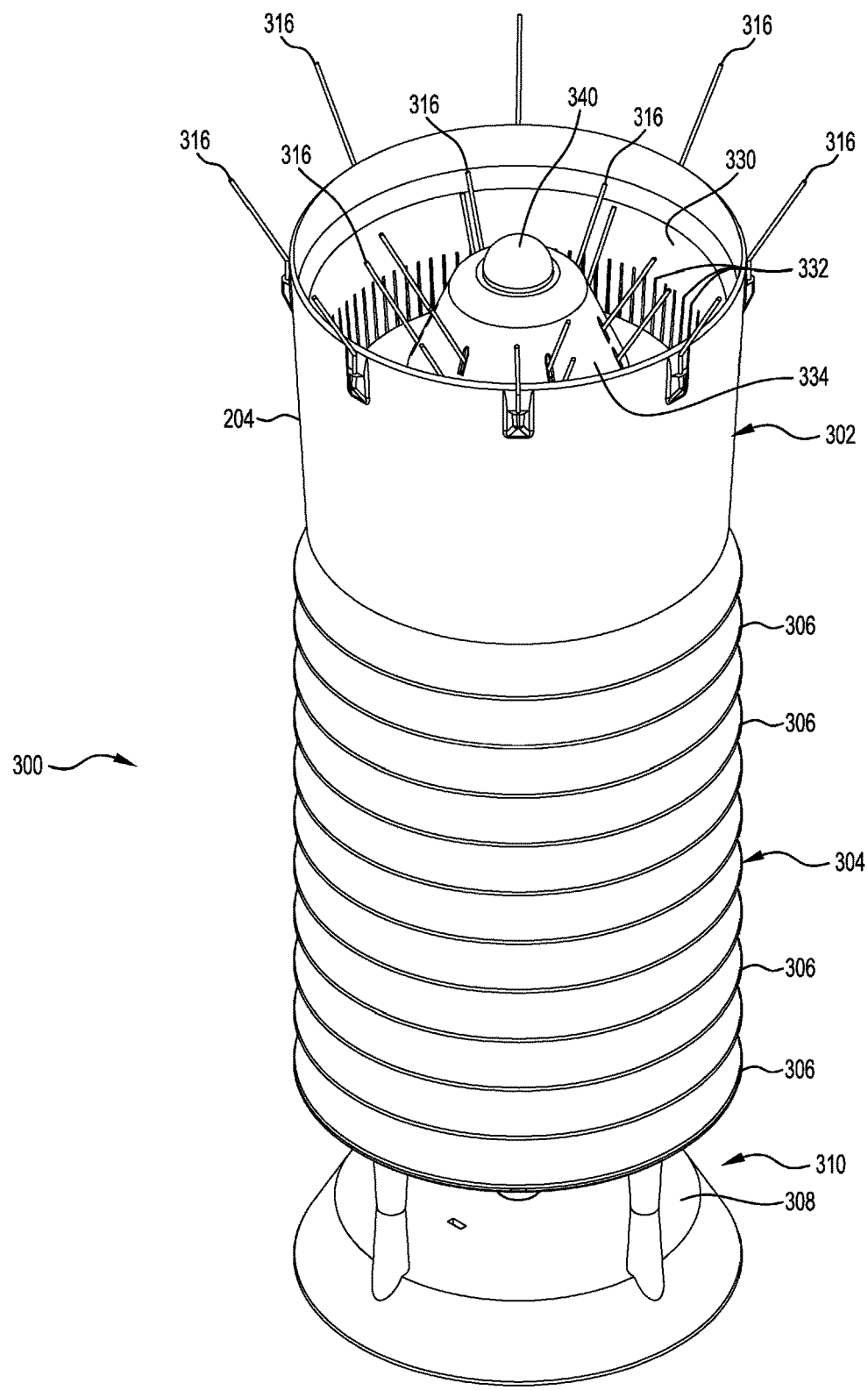
FIG. 8 is top perspective view of an embodiment of a weather station including a rain gauge.

The graph in FIG. 7 illustrates the correction computed for the opening of ball valve 50 to release water at predetermined times. For the brief period when the ball valve 50 is open, the water level (x) in the measurement chamber 30 and/or measurement tube 90 is decreasing. The software derives (interpolates) the change in water level $X_o$ for the period for which the valve 50 is open and therefore enables a continuous and cumulative measurement of captured rainfall for a continuous time domain.

The time of opening $T_o = t_2 - t_1$, where
 $t_1$ is the time at which the valve opens, and
 $t_2$ is the time at which the valve closes The software calculates;
 a. the rate of change water level $\Delta X_{prior}$ for a time period $\Delta T_{prior}$ prior to $t_1$; and
 b. the rate of change water level $\Delta X_{after}$ for a time period $\Delta T_{after}$ after $t_2$ The software then determines the average rate of change prior to and after the valve opening:

$$(\Delta X_{prior} + \Delta X_{after})/(\Delta T_{prior} + \Delta T_{after})$$

The equivalent change in water level $X_o$, $$X_o = T_o \times (\Delta X_{prior} + \Delta X_{after})/(\Delta T_{prior} + \Delta T_{after})$$

The cumulative water level $x_{cum}$ before the valve opening;

$$x_{cum} = x_1 \text{ (the water level at time } t_1\text{)}$$

The cumulative water level $x_{cum}$ after the valve closing:

$$x_{cum} = x_1 + X_o = x_2$$

The ultrasonic transducer 36 relies on a known reference measurement to compensate for the variation of the speed of sound in air due to temperature and humidity. The reference measurement for this device is the distance to the top surface of ball valve 50. The software controlling rain gauge 10 will regularly (typically daily) open the ball valve 50 and drain any residual water when a period of no rainfall is being detected. Rainfall forecasting software can be employed to assist in determining a period of no rainfall. After all water has been drained from the measurement chamber 30 and there is no precipitation, the rain gauge can be calibrated for temperature and humidity effects.

In a further aspect, the direct measurement of air temperature will enable the derivation of humidity during the calibration process. The time for the acoustic signal to transmit and reflect off ball valve 50 is a function of temperature and humidity. Humidity can be computed when temperature, the transmission time and the distance to the ball valve 50 are known.

FIGS. 3 to 6 also allow measurement of wind speed and wind direction using acoustic anemometers 109. Acoustic anemometers 109 are commercially available and use the time of flight of ultrasonic pulses to detect how fast the wind is blowing. Typically, three or more ultrasonic transducers 108 are used and mounted on arms 106 equidistant from each other and radially offset from the top of funnel or collector 14. The positioning of the acoustic anemometer 109 is not limited to the top of funnel or collector 14 but may be positioned at the bottom thereof as will be described in a later embodiment. The ultrasonic transducers 108 will measure the horizontal component of the wind speed and direction as it passes over the top of funnel or collector 14. The location of the ultrasonic transducers 108 with the signal direction at a vertical offset to funnel or collector 14 will enable the detection of objects (e.g. debris) obstructing the signal passing between ultrasonic transducers. This would be especially relevant if vegetative debris such as branches, twigs and leaves were obstructing the funnel opening with filter 16 in place. This would allow for the generation of an alarm, if such an event occurred.

Rain gauges 10 are typically located at ground level to avoid wind effects that occur when the rain gauge is located at a distance above the ground surface. The integration of anemometers 109 in the rain gauge will allow the rain gauge to be directly calibrated for wind effects and therefore positioned above ground surface and able to accurately measure rainfall (precipitation). Wind speed is a weather station input variable used in computing evapotranspiration.

Rain gauges 10 in FIGS. 1 to 7 can be integrated into an automatic weather station (not shown) which will include a solar panel for power, data logger with computer control for operational analysis and one or more of a thermometer, anemometer (as previously described), wind vane, hygrometer, barometer, ceilometer, present weather sensor and/or visibility sensor, snow depth sensor and pyranometer.

Figure 9:
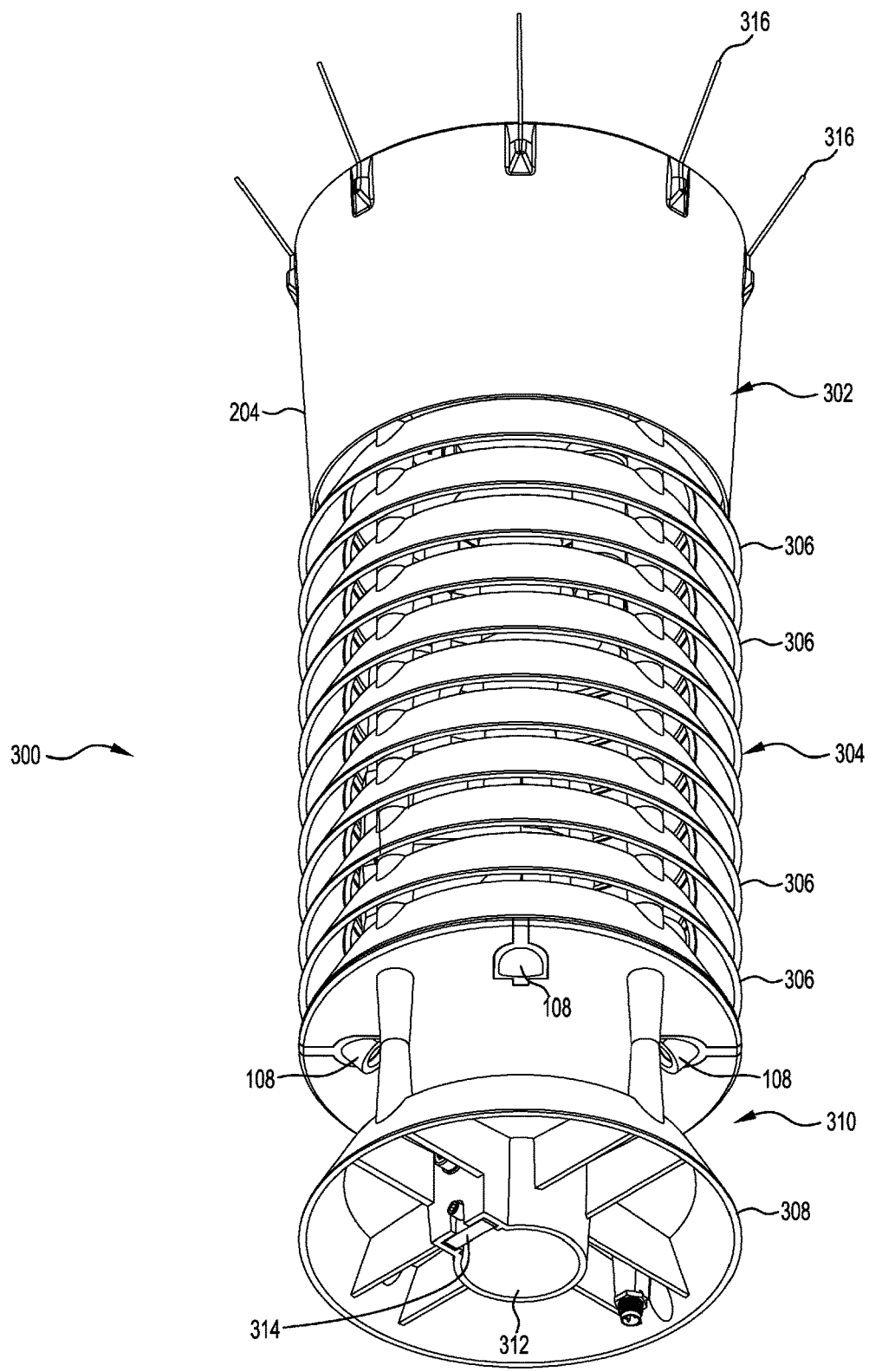
FIG. 9 is bottom perspective view of the weather station shown in FIG. 8.
Figure 10:
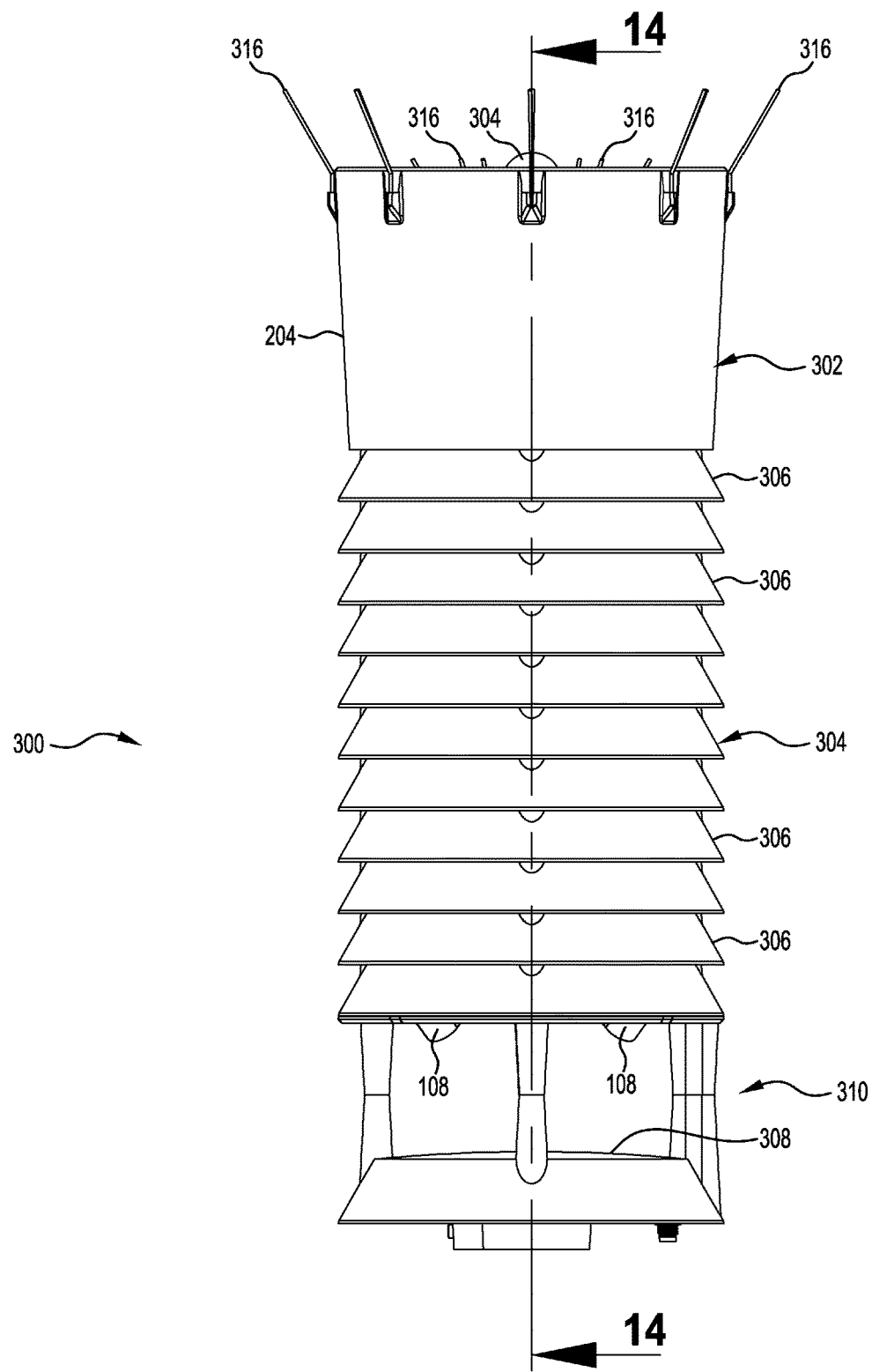
FIG. 10 is a first side view of the weather station shown in FIG. 8.
Figure 11:
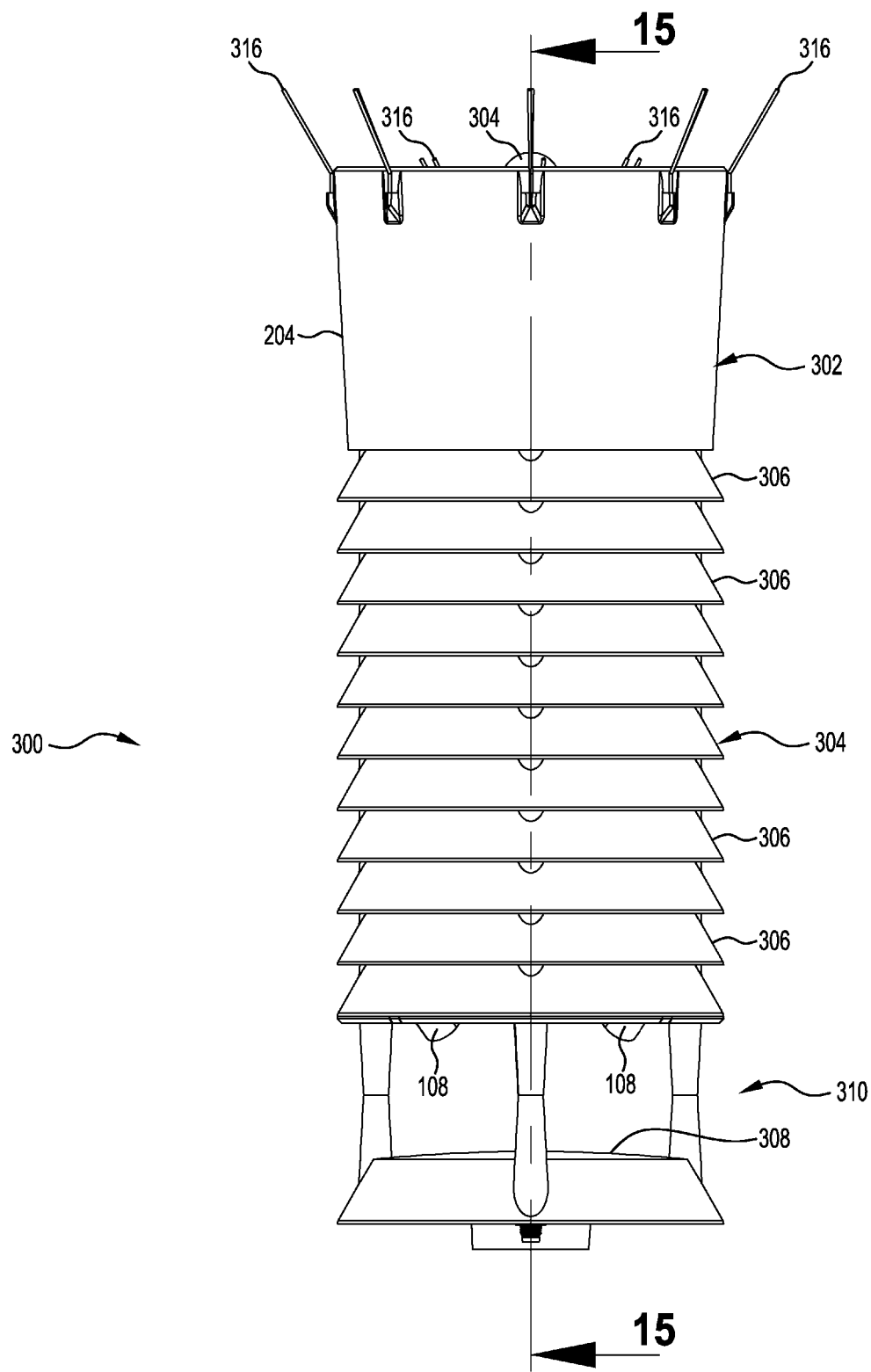
FIG. 11 is a second side view of the weather station shown in FIG. 8.
Figure 12:
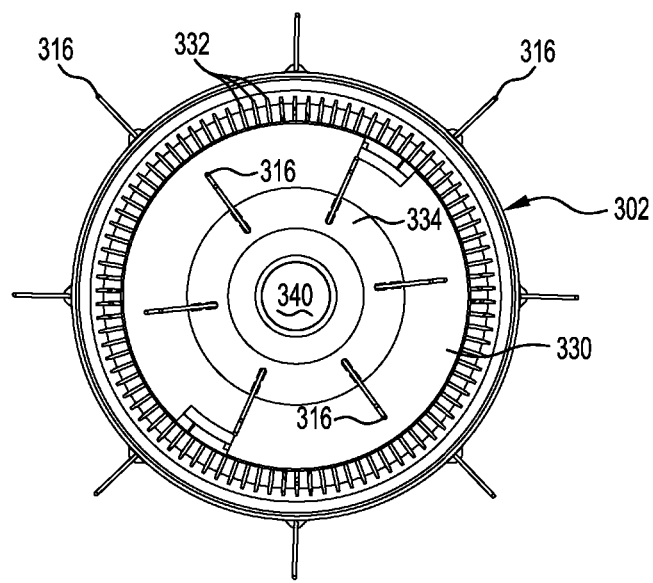
FIG. 12 is a top view of the weather station shown in FIG. 8.
Figure 13:
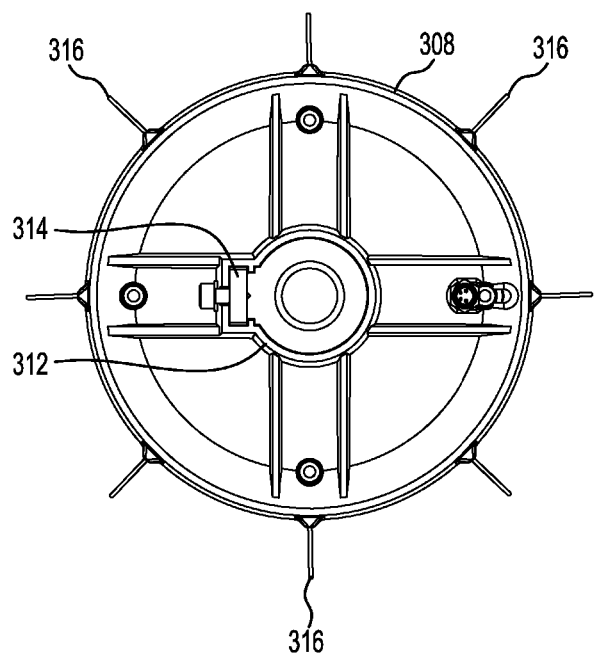
FIG. 13 is an underneath view of the weather station shown in FIG. 8.
Figure 14:
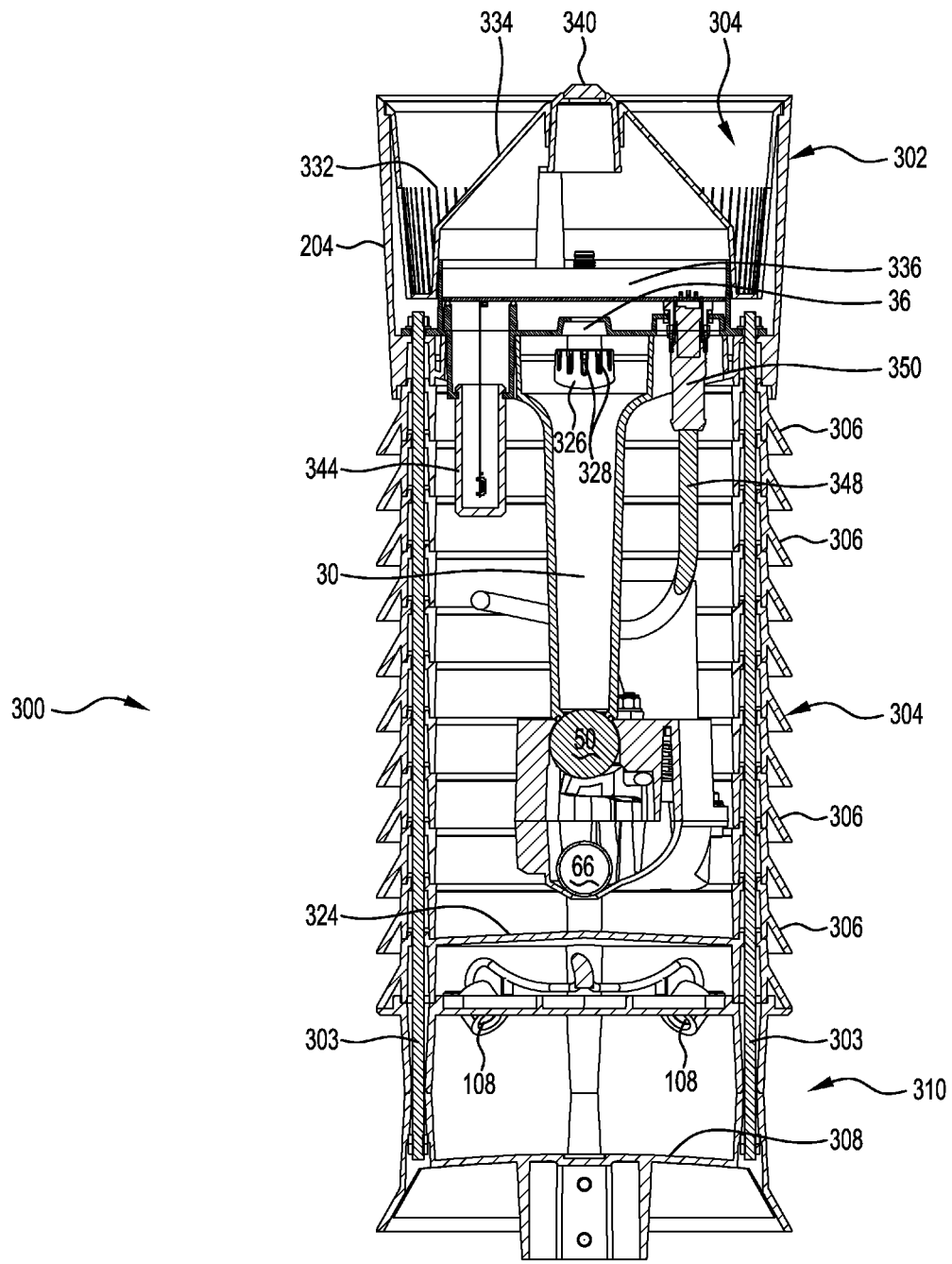
FIG. 14 is a cross-sectional view along and in the direction of arrows 14-14 in FIG. 10.
Figure 15:
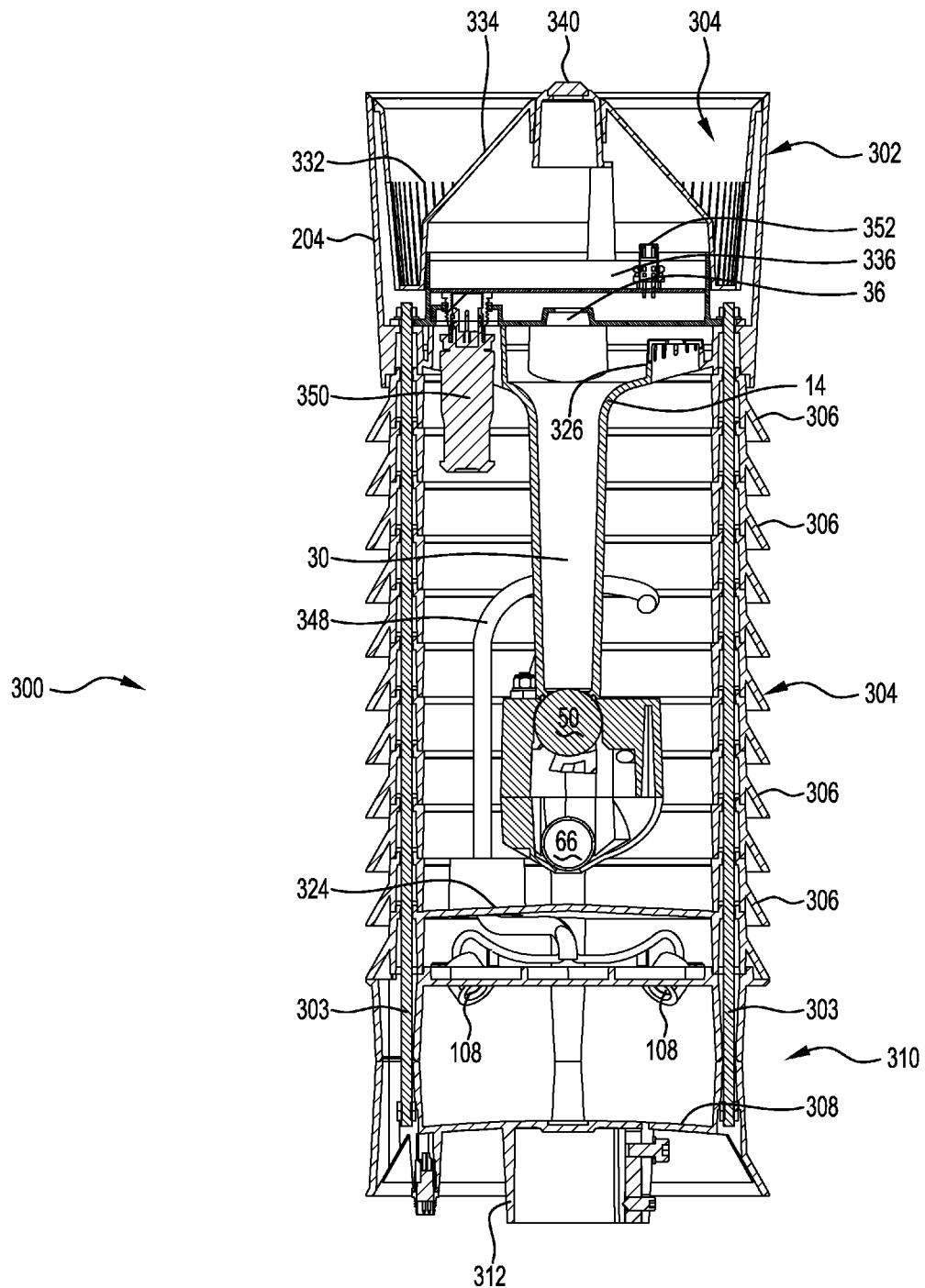
FIG. 15 is a cross-sectional view along and in the direction of arrows 15-15 in FIG. 11.
Figure 16:
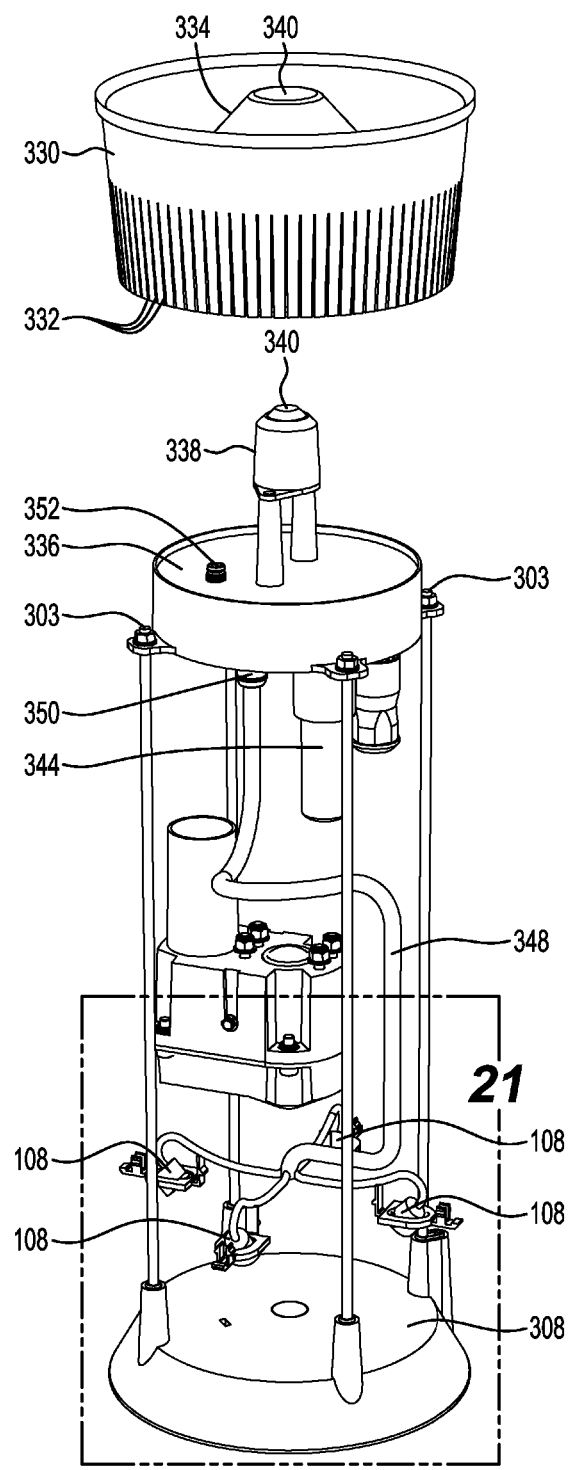
FIG. 16 is a perspective view of a partially disassembled weather station shown in FIG. 8 without the funnel or collector and measurement chamber.
Figure 17:
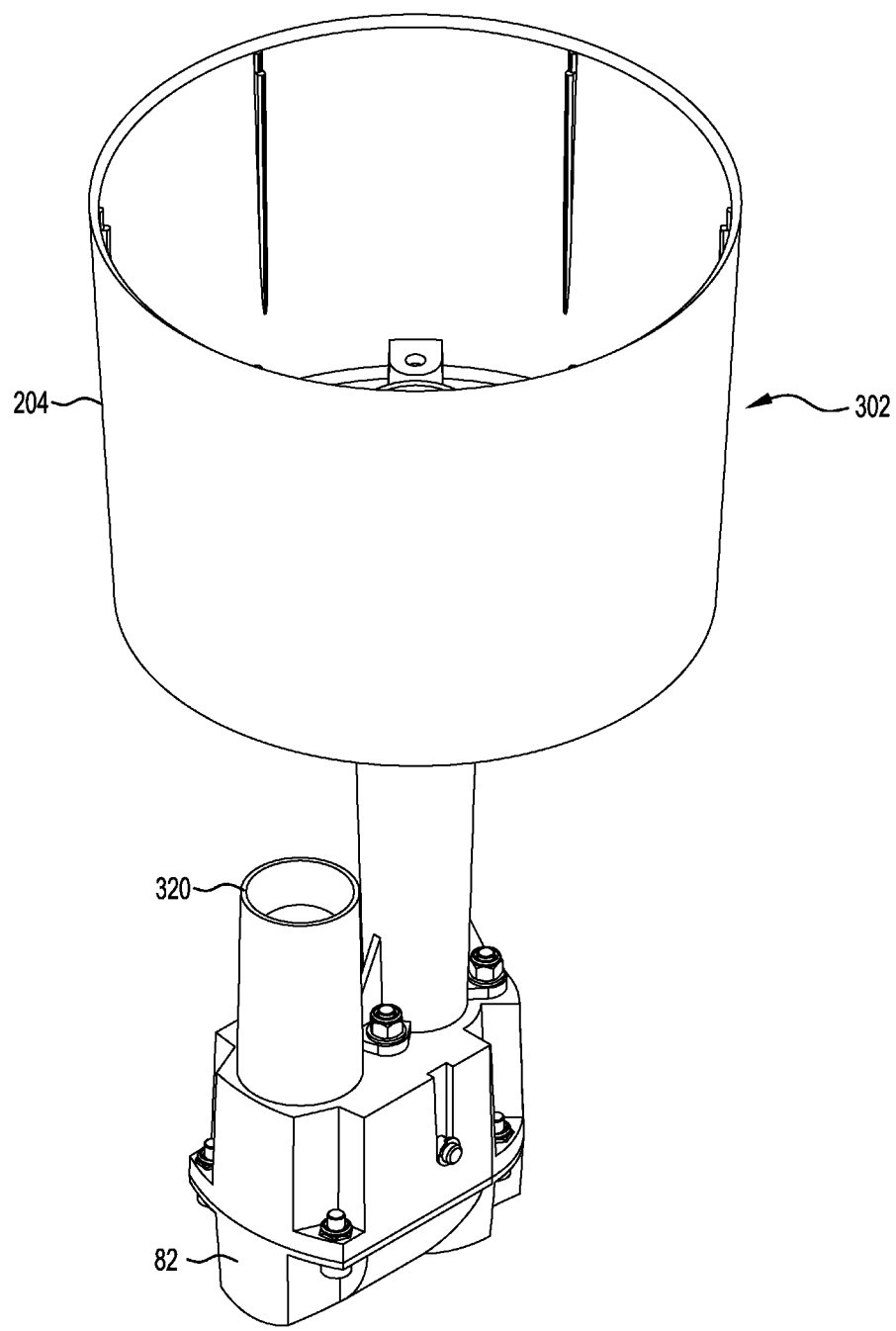
FIG. 17 is a perspective view of the rain gauge contained within the weather station shown in FIG. 8.
Figure 18:
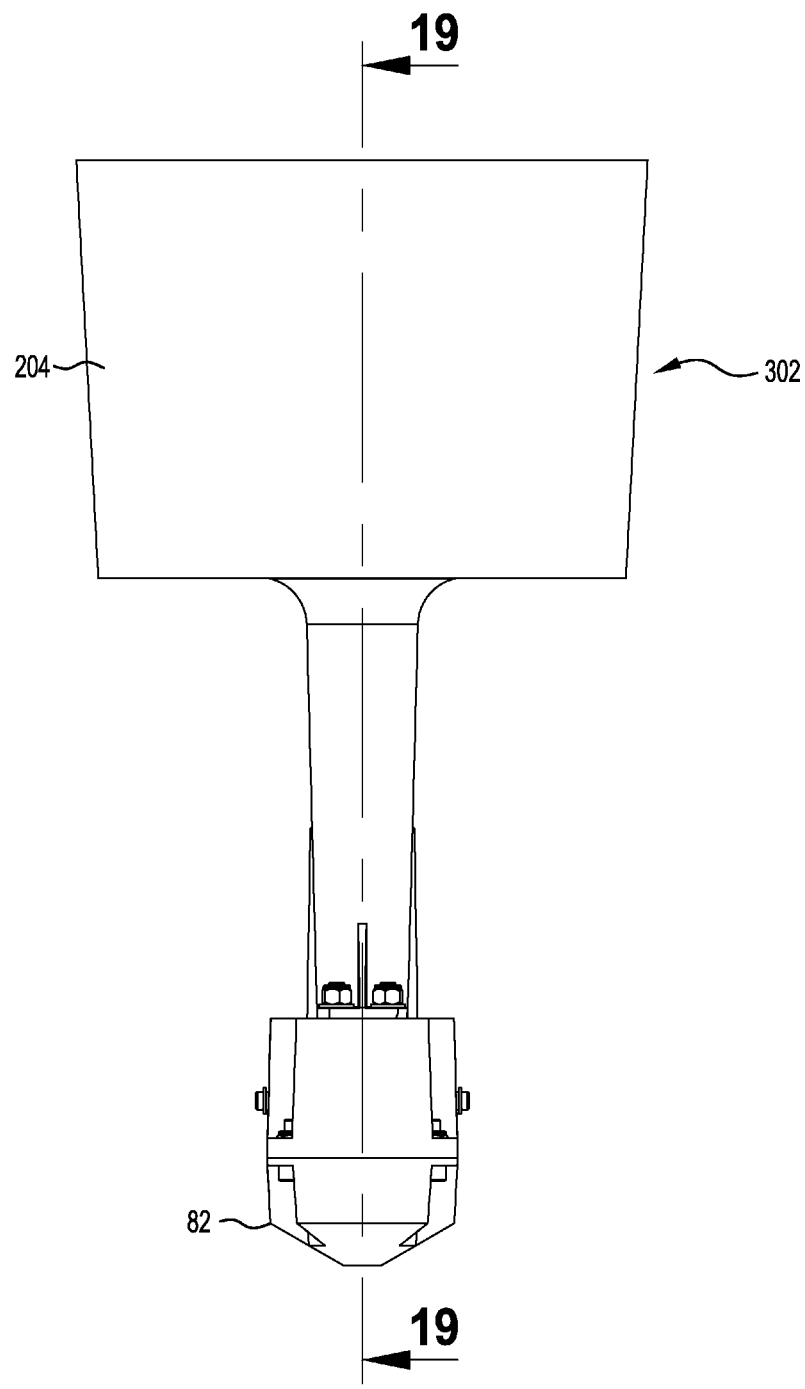
FIG. 18 is a rear view of FIG. 17.

FIGS. 8 to 21 show the integration of a rain gauge into a compact weather station 300. In order to avoid duplication of description, identical integers in FIGS. 1 to 7 will have the same reference numerals and function in FIGS. 1 to 7. Weather station 300 is basically cylindrical in shape but could be square, as in a traditional weather station, or any other desired shape. A rain gauge 302 is adapted to be attached to a Stevenson screen 304. The Stevenson screen 304 is a shelter or an enclosure to shield meteorological instruments against precipitation and direct heat radiation from outside sources, while still allowing air to circulate freely around them. A plurality of louvres 306 (not all of which are labeled) provide the shielding and allow the circulation of air, as best seen in FIGS. 9 and 14. A base member 308 completes the structure and is separated from Stevenson screen 304 by an air gap 310. The assembly of the weather station 300 is simplified by using four rods 303 through which the louvres pass and are interlocked with each other. Each rod 303 is secured at the top and bottom of the weather station. A ring 312 can contain a pole or pedestal (not shown) and can be set in position by adjustable clamping member 314. A plurality of bird control spikes 316 project from weather station 300 to prevent roosting of birds. Birds can produce large quantities of unsightly and unhygienic faeces which can foul the weather station. As a result, bird control spikes 316 are used to deter these birds without causing them harm or killing them.

Figure 19:
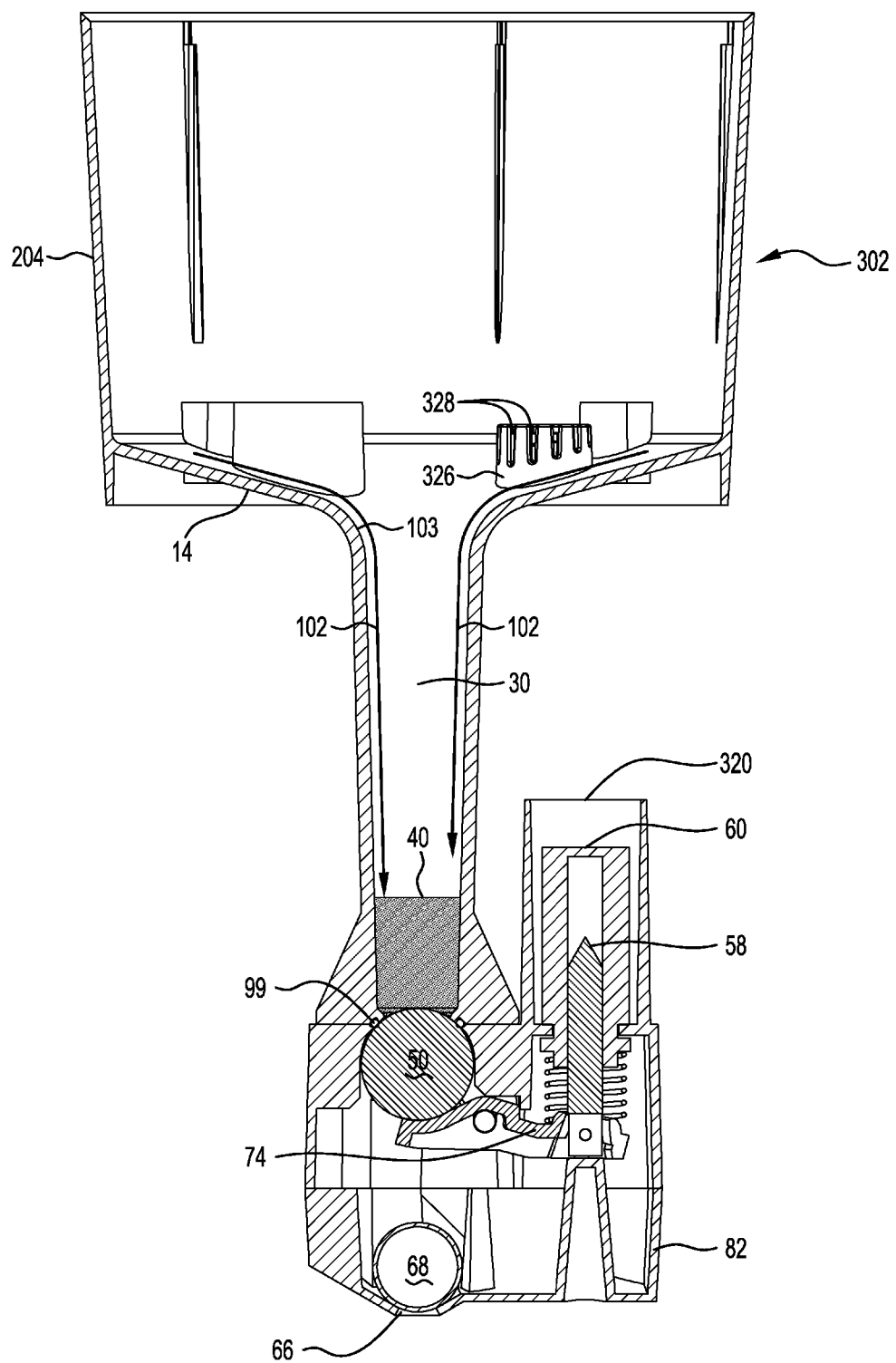
FIG. 19 is a cross-sectional view along and in the direction of arrows 19-19 in FIG. 18 with the ball valve in the closed position.
Figure 20:
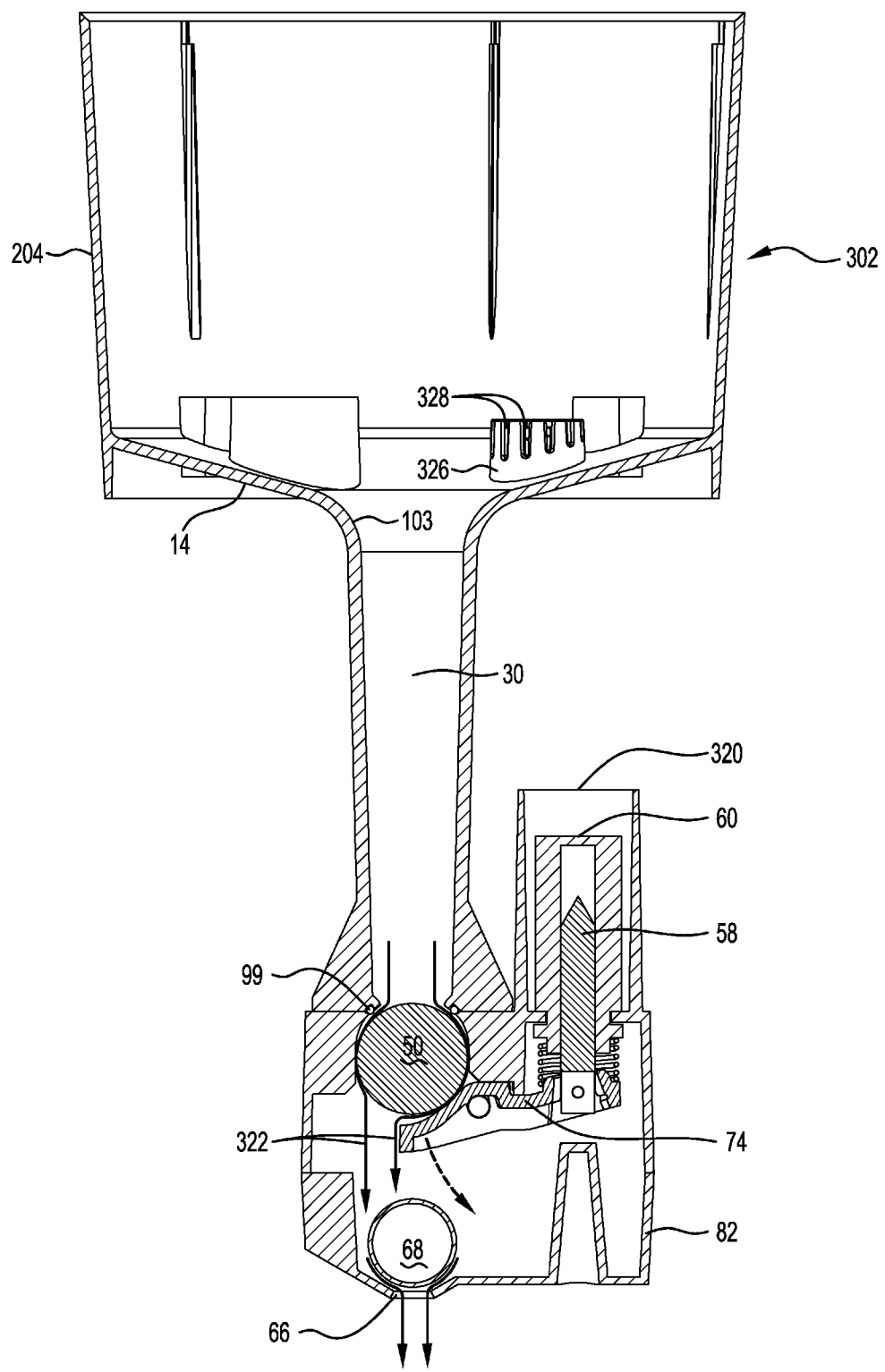
FIG. 20 is a similar view to that of FIG. 19 with the ball valve in a partial opened position.
Figure 21:
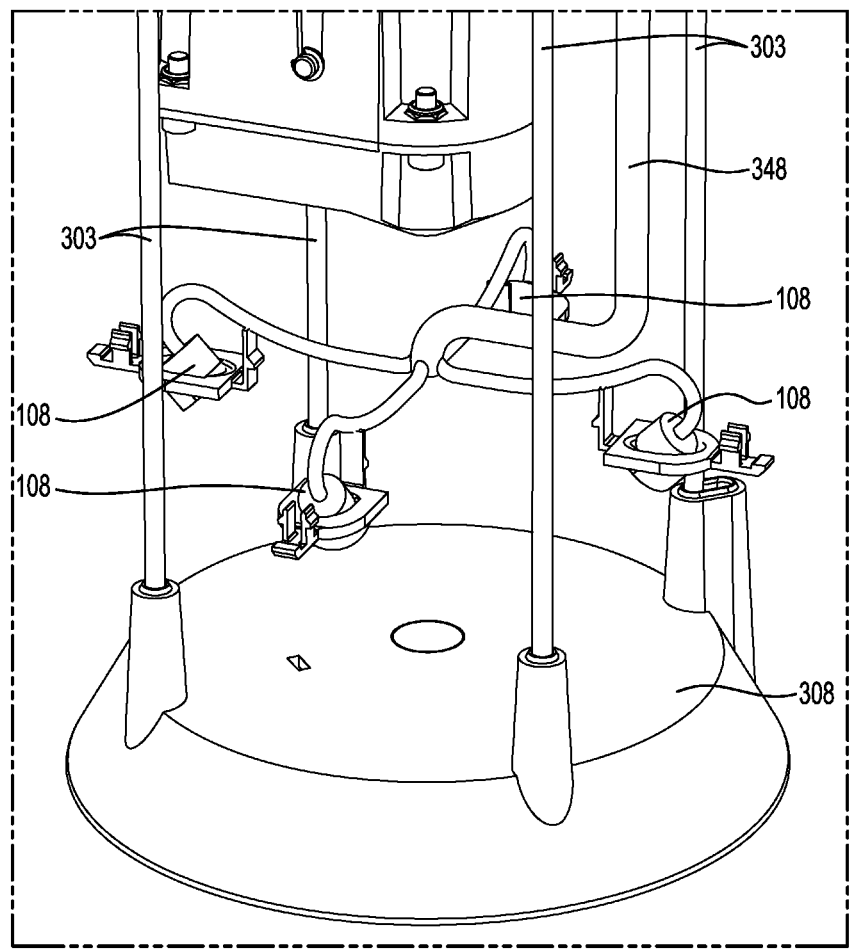
FIG. 21 is an enlargement of the zone 21 shown in FIG. 16.

FIGS. 17 to 20 show a rain gauge 302 that is similar to that shown in FIG. 4. The major differences are the change to the operation of the ball valve 50, the removal of water overflow passage 42 and the change to conical shaped housing 100. Rocker arm 74 is directly coupled to spring-loaded plunger 58 at one end and remains contact with ball valve 50 at the other end. For complete waterproofing, a grommet (not shown) can be inserted in housing opening 320. FIG. 19 shows the water level 40 with ball valve 50 closed and FIG. 20 shows the water being emptied as indicated by arrows 322 when solenoid 60 is actuated to drain through drainage hole 66. Float ball 68 can also be omitted, together with lower section 82, if required. The drained water will fall on slightly tapered plate 324 (FIGS. 14 and 15) and flow from Stevenson screen 304 to the ground.

Water overflow passage 42 has been replaced by a hollow boss 326 (best seen in FIG. 15) that directly opens into Stevenson screen 304 and falls onto slight tapered plate 324 to be drained away. Hollow boss 326 has slots 328 through which overflow water will enter to fall therethrough.

Conical shaped housing 100 and first and second filters 16, 20 have been revised in this embodiment. A cup member 330 sits inside vertical wall 204 of funnel or collector 14. Second filter 20 has been omitted and first filter 16 consists of a plurality of slots 332 circumferentially around the sides and base of cup member 330. A conical shaped hollow boss 334 rises from the base of cup member 330 and rain water entering cup member 330 can flow directly through slots 332, or be drained through slots 332 from conical shaped hollow boss 334 into funnel or collector 14 to measurement chamber 30. A printed circuit assembly 336 to control the weather station 300 can be encapsulated and shaped to sit under cup member 330. Weather station 300 includes a pyranometer 338 to measure solar irradiance on a planar surface and it is designed to measure the solar radiation flux density (W/m$^2$) within a typical wavelength range 300 nm to 2800 nm. The pyranometer 338 can be a photodiode with a diffuser or optical filters 340. The diffuser or optical filters 340 will project through an aperture 342 (FIG. 16) at the top of conical shaped hollow boss 334 and be sealingly affixed thereto. Pyranometer 338 can be coupled to printed circuit assembly 336 using connector 352. The inclusion of pyranometer 338 provides a powerful and convenient addition within the rain gauge or weather station.

Attached to printed circuit assembly 336 or located within Stevenson screen 304 are meteorological instruments in a pod 344. Typically pod 344 may contain a selection from temperature sensor, humidity sensor, barometric pressure sensor and any other desired meteorological instruments. The ultrasonic sensor 36 is also incorporated into printed circuit assembly 336 and transmits and receives acoustic signals into measurement chamber 30 as described with reference to the previously discussed embodiments.

Air gap 310 provides a zone for measurement of wind speed and direction. Typically, three or more ultrasonic transducers 108 (four are shown in this embodiment) are used and mounted on a plate 346 equidistant from each other and point at base member 308. Ultrasonic transducers 108 use resonating acoustic (ultrasonic) waves within air gap 310 in order to perform their measurement. As wind passes through air gap 310, a change in the wave's property occurs (phase shift). By measuring the amount of phase shift in the received signals by each transducer, and then by mathematically processing the data, the sensor is able to provide an accurate horizontal measurement of wind speed and direction. A wiring loom 348 couples the ultrasonic transducers 108 to electrical connector 350 on printed circuit assembly 336.

In a further embodiment weather station 300 may incorporate one or multiple RF (Radio Frequency) antennae for communication with other weather stations or a computer-controlled irrigation management system (not shown). Automatic weather stations are typically connected to a telemetry system to access data in real-time. The telemetry systems often communicate using RF networks. As a result, RF antennae are typically an integral element of weather station infrastructure. The location thereof coupled to weather station elements has often been problematic. The weather station 300 has multiple rods 303 providing structural support to the elements that comprise the weather station. Rods 303 and/or the holes through which they pass can may incorporate an antenna (not shown). At least one antenna may be provided, or a plurality of antennae may be used to improve reception. Additionally, it is possible to incorporate antennae (not shown) into one or more louvres 306. This would allow for both vertical (via rods 303) and horizontal (via louvres 306) as required in the design of antennae to suit the various frequencies employed. An inherent problem with co-located antennae is interference. It is proposed that for multiple antennae applications that the use of each antenna would be managed by software to sequence their operation so that there would not be any overlap in their operation. This is often referred to as multiplexing.

In another embodiment rain gauges 10 or weather stations 300 can be integrated into a computer-controlled irrigation management system (not shown). Such a system is disclosed in the specification of International Patent Application No. PCT/AU2018/050858 filed on 14 Aug. 2018. The contents of International Patent Application No. PCT/AU2018/050858 are herein incorporated. Rain gauge 10 or weather station 300 can be installed on each of the solar controlled devices discussed in International Patent Application No. PCT/AU2018/050858. This system can include one or more of the following operations on rain gauge 10 or weather station 300:

1. Continuous real-time measurement of rainfall;
2. Opening ball valve when the water level reaches a pre-determined reference level to drain the measurement chamber;
3. Continuing to measure the water level from the water level within the measurement chamber, if the draining does not release all water from the measurement chamber;
4. Detecting the cessation of rainfall so water in the measurement chamber can be drained;
5. Recalibrating the ultrasonic transducer against the known distance to ball valve and adjusting parameters for variations with temperature and humidity;
6. Deriving the humidity at the rain gauge from temperature measurements;
7. Detecting faulty sealing of ball valve if water level drops without rainfall;
8. Detecting valve operation failure when the measurement chamber is filled beyond a predefined reference level; and
9. Isolating a rain gauge on overflow from the rain gauge.

Variations can be made to the embodiments to suit various environmental or design requirements. The ultrasonic transducer can be replaced by other types of sensors to measure the water level height. The shape and structure of offset pipe 24 can also be reshaped or eliminated, as shown in FIGS. 3 and 4.

An exemplary embodiment of the present invention provides a rain gauge that is accurate and requires little human intervention.

An exemplary embodiment of the invention provides a rain gauge that is cheap to make and can be integrated into a computer-controlled irrigation management system or automatic weather station.

Glossary

In this specification "ball valve" shall be interpreted as a constrained movable spherical ball, that in the closed position, seals an outlet port to prevent escape of fluid therefrom, and in the open position, is free of said outlet port to allow rapid flow of fluid under gravity through said outlet port.

CONCLUSION

The invention will be understood to embrace many further modifications as will be readily apparent to persons skilled in the art and which will be deemed to reside within the broad scope and ambit of the invention, there having been set forth herein only the broad nature of the invention and specific embodiments by way of example.

The invention claimed is:

1. A rain gauge for measurement of rain fall, said rain gauge including:
   a measurement chamber having an inlet port at one end and a drainage port at the other end, said drainage port being closed by a ball valve, said ball valve programmable to be opened at predefined events to release water collected in said measurement chamber,
   a funnel or collector adapted to receive rain fall, said funnel or collector opening into said inlet port, and
   an ultrasonic transducer for transmitting and receiving acoustic signals into said measurement chamber, said ultrasonic transducer being programmable to determine the water level in said measurement chamber and being programmable to allow calibration of said rain gauge based on the distance between said ultrasonic transducer and said ball valve surface.

2. The rain gauge of claim 1, further including a smooth curved entry into said measurement chamber to reduce turbulence of water entering said measurement chamber.

3. The rain gauge of claim 1, wherein said measurement chamber includes a sealing ring to ensure fluid tight closure at said drainage port.

4. The rain gauge of claim 3, wherein said sealing ring is positioned within said drainage port and said ball valve abuts said sealing ring and said drainage port.

5. The rain gauge of claim 1, wherein said ball valve is opened and closed by a solenoid actuator.

6. The rain gauge of claim 5, wherein said solenoid actuator further includes a ramped member co-operating with said valve to allow opening and closing of said valve.

7. The rain gauge of claim 1, further including a float valve within said drainage port to prevent ingress of matter when said ball valve is closed.

8. The rain gauge of claim 1, further including a water overflow drain in said funnel to prevent said measurement chamber from overfilling.

9. The rain gauge of claim 1, wherein the flow of water into said inlet port does not interfere with the operation of the ultrasonic transducer.

10. The rain gauge of claim 1, wherein said ultrasonic transducer is located above said inlet port.

11. The rain gauge of claim 1, further including an offset pipe linking said funnel or collector to said inlet port.

12. The rain gauge of claim 11, wherein the offset pipe allows laminar flow entry of water into said inlet port.

13. The rain gauge of claim 1, wherein said funnel or collector includes a first filter at its open end to reduce ingress of contaminants into said rain gauge.

14. The rain gauge of claim 13, wherein said first filter includes a perforated metal grid with sharp edges to reduce wind effecting the correct volume of precipitation entering said funnel or collector and reduce the risk of birds, or other creatures, covering said funnel or collector.

15. The rain gauge of claim 13, wherein a second filter is located within said funnel or collector and said second filter being finer than said first filter.

16. The rain gauge of claim 1, wherein said measuring chamber is tubular and has a constant cross-sectional area.

17. The rain gauge of claim 1, wherein said measurement chamber is integrated in a housing, said housing including a solenoid actuator at the top thereof, said solenoid actuator providing movement to a push rod slidably located within said housing, and said push rod co-operating with a rocker arm to engage said ball valve.

18. The rain gauge of claim 17, wherein said housing includes a plurality of vanes within said drainage port to limit lateral movement of said ball valve.

19. The rain gauge of claim 1, wherein said calibration takes into consideration temperature and humidity effects and is programmed to occur when said measurement chamber is empty and no rainfall is forecast or detected.

20. The rain gauge of claim 1, further including a plurality of ultrasonic transducers forming an acoustic anemometer arranged above and around said funnel or collector to allow calculation of wind speed and direction.

21. The rain gauge of claim 1, further including a measurement tube located within said measurement chamber with one end adjacent said ball valve and the other end secured to said ultrasonic transducer to allow transmission and receiving of said acoustic signals within said measurement tube.

22. The rain gauge of claim 21, wherein at least one air vent is located in said measurement tube to allow equalisation of water level with both said measurement chamber and said measurement tube.

23. The rain gauge of claim 1, further including a cap member located within said funnel or collector and above said inlet port, said cap member adapted to guide rainfall into said inlet port.

24. The rain gauge of claim 23, wherein said cap member is formed as a conical shaped housing and has a gap between the funnel or collector to, in use, guide rainfall from the top of the cap member through said gap and into said inlet port.

25. The rain gauge of claim 23, wherein said cap member is supported by a plurality of vertical legs in said funnel or collector.

26. The rain gauge of claim 23, wherein said ultrasonic transducer is located in said cap member above said measurement chamber.

27. The rain gauge of claim 1, wherein said rain gauge is programmed to derive or interpolate the change in water level when said ball valve is open to provide a continuous and cumulative measurement of captured rainfall.

28. The rain gauge of claim 1, further including a cup shaped member sitting inside said funnel or collector, said cup shaped member having a plurality of slots circumferentially around the sides and base thereof to allow rain entering said cup shaped member to flow out through said plurality of slots into said funnel or collector.

29. The rain gauge of claim 28, further including a hollow tapered boss projecting from the base of said cup shaped member, said hollow tapered boss having an aperture at the top thereof through which a diffuser of a pyranometer protrudes.

30. A computer-controlled irrigation management system, including:
    at least one rain gauge for measurement of rain fall, each of said rain gauge including:
        a measurement chamber having an inlet port at one end and a drainage port at the other end, said drainage port being closed by a ball valve, said ball valve programmable to be opened at predefined events to release water collected in said measurement chamber,
        a funnel or collector adapted to receive rain fall, said funnel or collector opening into said inlet port, and
        an ultrasonic transducer for transmitting and receiving acoustic signals into said measurement chamber, said ultrasonic transducer being programmable to determine the water level in said measurement chamber and being programmable to allow calibration of said rain gauge based on the distance between said ultrasonic transducer and said ball valve surface,
    said system being programmed to provide operational control and collection of data from said at least one rain gauge.

31. The computer-controlled irrigation management system of claim 30, said system configured to perform at least one operation selected from the group consisting of:
    opening said ball valve when the water level reaches a predetermined reference level to drain said measurement chamber;
    continuing to measure the water level within the measurement chamber using the ultrasonic transducer when opening said ball valve does not release all water from the measurement chamber;
    when all water has drained from the measurement chamber, recalibrating said ultrasonic transducer against the distance to said ball valve surface including detecting a temperature using a temperature sensor of the system, detecting a humidity using a humidity sensor of the system, and adjusting parameters of the ultrasonic transducer based on the sensed temperature and humidity;
    detecting a faulty seal of the ball valve when the water level drops without rainfall;
    detecting ball valve operation failure when said measurement chamber is filled beyond a redefined reference level; and
    directing water in the measurement chamber through an overflow passage to prevent water damage to the ultrasonic transducer.

32. An automatic weather station including:
    a rain gauge for measurement of rain fall, said rain gauge including:
        a measurement chamber having an inlet port at one end and a drainage port at the other end, said drainage port being closed by a ball valve, said ball valve programmable to be opened at predefined events to release water collected in said measurement chamber,
        a funnel or collector adapted to receive rain fall, said funnel or collector opening into said inlet port, and
        an ultrasonic transducer for transmitting and receiving acoustic signals into said measurement chamber, said ultrasonic transducer being programmable to determine the water level in said measurement chamber and being programmable to allow calibration of said rain gauge based on the distance between said ultrasonic transducer and said ball valve surface, a solar panel for power, a data logger with computer control for operational analysis, and one or more of a thermometer, anemometer, wind vane, hygrometer, barometer, ceilometer, present weather sensor and/or visibility sensor, snow depth sensor and pyranometer.

33. An automatic weather station including:

a rain gauge for measurement of rain fall, said rain gauge including:
  a measurement chamber having an inlet port at one end and a drainage port at the other end, said drainage port being closed by a ball valve, said ball valve programmable to be opened at predefined events to release water collected in said measurement chamber,
  a funnel or collector adapted to receive rain fall, said funnel or collector opening into said inlet port, and
  an ultrasonic transducer for transmitting and receiving acoustic signals into said measurement chamber, said ultrasonic transducer being programmable to determine the water level in said measurement chamber and being programmable to allow calibration of said rain gauge based on the distance between said ultrasonic transducer and said ball valve surface, a housing with said rain gauge located at the top thereof to collect rainfall, said housing having a Stevenson screen below said rain gauge to shield meteorological instruments contained therein against precipitation and direct heat radiation from outside sources, while allowing air to circulate freely around them.

34. The automatic weather station of claim 33, wherein said housing includes a plurality of ultrasonic transducers forming an acoustic anemometer arranged below said Stevenson screen to allow calculation of wind speed and direction.

35. The automatic weather station of claim 33, further including a pyranometer located within a cap member extending from said rain gauge.

36. The automatic weather station of claim 35, wherein said pyranometer comprises a UV sensor or photodiode protected by a light diffuser.

37. The automatic weather station as claimed in claim 33, further including bird control spikes projecting from said rain gauge to prevent roosting of birds on said weather station.

38. The automatic weather station as claimed in claim 33, wherein said housing is cylindrical.

39. The automatic weather station as claimed in claim 33, wherein said housing is formed from interlocking components that are held together by rods passing through holes in said interlocking components.

40. The automatic weather station as claimed in claim 39, wherein one or more of said rods and/or said holes incorporate an antenna for radio communication.

41. The automatic weather station as claimed in claim 39, wherein one or more of said louvres incorporate an antenna for radio communication.

* * * * *